United States Patent [19]
Nishikawa et al.

[11] Patent Number: 5,568,030
[45] Date of Patent: Oct. 22, 1996

[54] TRAVEL CONTROL METHOD, TRAVEL CONTROL DEVICE, AND MOBILE ROBOT FOR MOBILE ROBOT SYSTEMS

[75] Inventors: Yuji Nishikawa; Masanori Onishi, both of Ise, Japan

[73] Assignee: Shinko Electric Co., Ltd., Tokyo, Japan

[21] Appl. No.: 480,303

[22] Filed: Jun. 7, 1995

Related U.S. Application Data

[62] Division of Ser. No. 912,977, Jul. 8, 1992, Pat. No. 5,488,277, which is a continuation of Ser. No. 513,546, Apr. 24, 1990, Pat. No. 5,179,329.

[30] Foreign Application Priority Data

| Apr. 25, 1989 | [JP] | Japan | 1-105491 |
| May 24, 1989 | [JP] | Japan | 1-130959 |
| May 29, 1989 | [JP] | Japan | 1-134883 |
| May 29, 1989 | [JP] | Japan | 1-134884 |
| May 30, 1989 | [JP] | Japan | 1-137290 |
| May 30, 1989 | [JP] | Japan | 1-137291 |
| May 30, 1989 | [JP] | Japan | 1-137292 |
| May 30, 1989 | [JP] | Japan | 1-137293 |
| May 31, 1989 | [JP] | Japan | 1-138219 |
| Jun. 20, 1989 | [JP] | Japan | 1-157838 |
| Jun. 20, 1989 | [JP] | Japan | 1-157839 |

[51] Int. Cl.$^6$ .............................. H02J 7/00; G06F 15/50
[52] U.S. Cl. ................. 318/587; 318/568.1; 318/568.12; 901/1; 395/80
[58] Field of Search .................... 318/560–640; 901/1, 3, 5, 7, 13, 23; 395/901, 904, 705, 913, 80–99; 364/424.02, 424.04

[56] References Cited

U.S. PATENT DOCUMENTS

| 3,147,817 | 9/1964 | DeLiban | 180/168 |
| 3,495,677 | 2/1970 | Wilson | 180/168 |
| 3,512,601 | 5/1970 | Wilson | 180/168 |
| 3,734,229 | 5/1973 | Comer | 180/168 |
| 4,284,160 | 8/1981 | DeLiban et al. | 318/598 X |
| 4,350,969 | 9/1982 | Greer | 364/460 X |
| 4,470,119 | 9/1984 | Hasebe et al. | 364/449 |
| 4,504,913 | 3/1985 | Miura et al. | 364/449 |
| 4,511,973 | 4/1985 | Miura et al. | 364/449 |
| 4,513,377 | 4/1985 | Hasebe et al. | 364/449 |
| 4,514,810 | 4/1985 | Ito et al. | 364/424 |
| 4,674,048 | 6/1987 | Okumura | 364/424.02 |
| 4,716,530 | 12/1987 | Ogawa et al. | 364/424.02 |
| 4,777,416 | 10/1988 | George et al. | 318/568 |
| 4,780,817 | 10/1988 | Lofgren | 318/587 X |
| 4,791,571 | 12/1988 | Takahashi et al. | 364/436 |
| 4,878,003 | 10/1989 | Knepper | 318/576 X |

(List continued on next page.)

FOREIGN PATENT DOCUMENTS

| 0229669 | 7/1987 | European Pat. Off. . |
| 0346538 | 12/1989 | European Pat. Off. . |
| 0367527 | 5/1990 | European Pat. Off. . |
| 3538908 | 5/1987 | Germany . |
| 62-032519 | 2/1987 | Japan . |

*Primary Examiner*—Paul Ip
*Attorney, Agent, or Firm*—Loeb & Loeb LLP

[57] ABSTRACT

In the travel control method in the mobile robot system including a plurality of mobile robots and the control station for controlling these mobile robot, the control station directs one of a plurality of mobile robots to the destination robot, responding to the direction, searches the route to the destination directed by the control station and sends the result to the control station. The control station which receives this in formation checks if the travel path searched by the mobile robot is already reserved by other mobile robots or not by the reservation table. If not, the control station informs the reserve completion to said mobile robot. The mobile robot which received the information of the reservation completion travels automatically along the travel path which is already reserved. In addition, said control station, when there are other mobile robots which disturb the travel of each mobile robot, directs the robot to wait or to take an alternate route according to the situation, or directs other mobile robots that disturb the travel to halt.

4 Claims, 20 Drawing Sheets

U.S. PATENT DOCUMENTS

| | | | |
|---|---|---|---|
| 4,890,233 | 12/1989 | Ando et al. | 364/457 |
| 4,896,087 | 1/1990 | Onaga et al. | 318/508.2 |
| 4,916,302 | 4/1990 | Sorimachi | 356/1 |
| 4,926,103 | 5/1990 | Summerville et al. | 318/587 |
| 4,937,572 | 6/1990 | Yamada et al. | 364/449 |
| 4,939,651 | 7/1990 | Onishi | 364/424.02 |
| 4,940,925 | 7/1990 | Wand et al. | 318/587 |
| 4,979,113 | 12/1990 | Roberts et al. | 180/168 X |
| 4,989,151 | 1/1991 | Nuimura | 364/449 |
| 4,999,783 | 3/1991 | Tenmoku et al. | 364/450 |
| 5,001,635 | 3/1991 | Yasutomi et al. | 374/424.02 |
| 5,052,799 | 10/1991 | Sasser et al. | 364/449 X |
| 5,060,162 | 10/1991 | Ueyama et al. | 364/449 |
| 5,081,585 | 1/1992 | Kurami et al. | 318/587 |
| 5,144,685 | 9/1992 | Nasar et al. | 395/88 |

FIG. 4 (a)

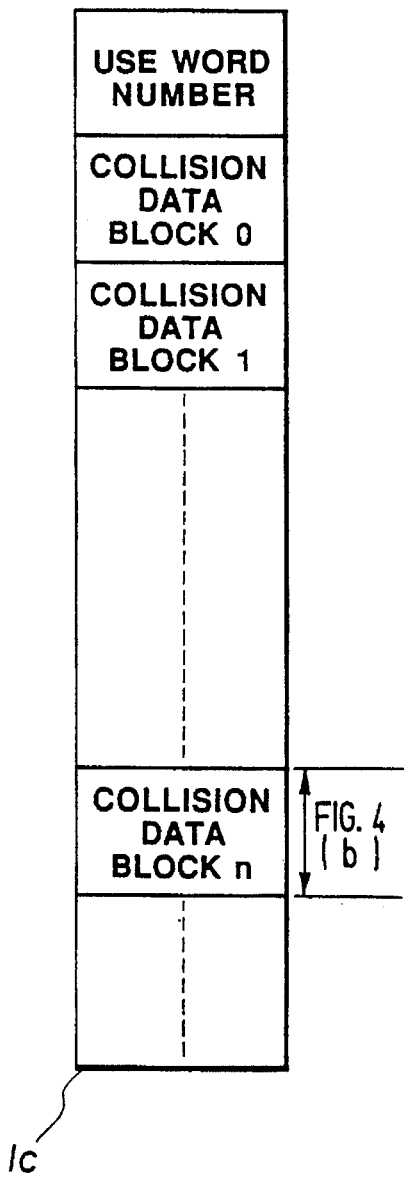

| USE WORD NUMBER |
| --- |
| COLLISION DATA BLOCK 0 |
| COLLISION DATA BLOCK 1 |
| ⋮ |
| COLLISION DATA BLOCK n |
| ⋮ |

| FIRST NODE INTERVAL USE WORD NUMBER |
| --- |
| START-POINT COLLISION NODE NUMBER |
| START-POINT OPERATION COLLISION NODE NUMBER |
| END-POINT COLLISION NODE NUMBER |
| END-POINT OPERATION COLLISION NODE NUMBER |
| NODE INTERVAL COLLISION NODE NUMBER |
| TRAVEL DIRECTION ORDER COLLISION NODE NUMBER |
| REVERSE TRAVEL DIRECTION COLLISION NODE NUMBER |
| START-POINT COLLISION NODE |
| START-POINT OPERATION COLLISION NODE |
| END-POINT COLLISION NODE |
| END-POINT OPERATION COLLISION NODE |
| NODE INTERVAL COLLISION NODE |
| TRAVEL DIRECTION ORDER COLLISION NODE |
| REVERSE TRAVEL DIRECTION COLLISION NODE |

RESERVE TABLE

FIG. 18

NODE NUMBER TABLE

| TOTAL NUMBER OF NODES RECORDED |
| --- |
| FIRST RECORDED NODE NUMBER |
| SECOND RECORDED NODE NUMBER |
| THIRD RECORDED NODE NUMBER |
| ⋮ |
| n RECORDED NODE NUMBER |
| IN THE CASE WHERE NO NODE NUMBER IS RECORDED, 0 IS RECORDED |

NDT

FIG. 19 (a)

NWT

| |
| --- |
| NETWORK INFORMATION FOR FIRST RECORDED NODE |
| NETWORK INFORMATION FOR SECOND RECORDED NODE |
| NETWORK INFORMATION FOR THIRD RECORDED NODE |
| ⋮ |
| NETWORK INFORMATION FOR n RECORDED NODE (FIG 19(b)) |
| ⋮ |

FIG. 19 (b)

| |
| --- |
| NODE X-COORDINATES |
| NODE Y-COORDINATES |
| OPERATION POINT X-COORDINATES |
| OPERATION POINT Y-COORDINATES |
| CONNECTION NODE NUMBER N0 |
| CONNECTION NODE NUMBER N1 |
| CONNECTION NODE NUMBER N2 |
| CONNECTION NODE NUMBER N3 |
| SCENE NUMBER 0 |
| SCENE NUMBER 1 |
| SCENE NUMBER 2 |
| SCENE NUMBER 3 |
| SCENE OFFSET 0 |
| SCENE OFFSET 1 |
| SCENE OFFSET 2 |
| SCENE OFFSET 3 |

FIG. 20 (a)
SCENE TABLE
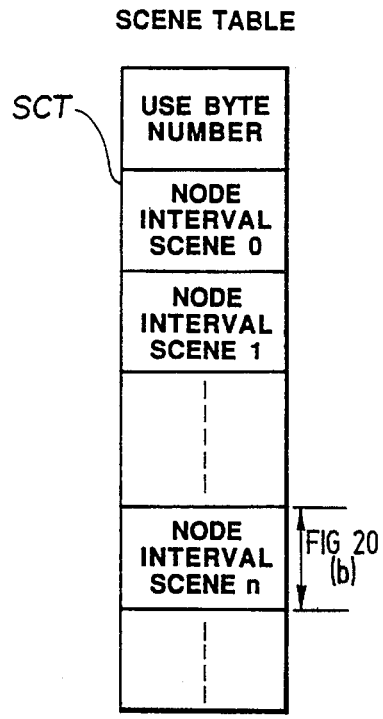
FIG. 20 (b)
NODE INTERVAL SCENE n COMPOSITION
| FIRST SCENE USE BYTE NUMBER |
| --- |
| START-POINT NODE NUMBER |
| END-POINT NODE NUMBER |
| NODE INTERVAL DIRECT DISTANCE |
| NODE INTERVAL ACTUAL DISTANCE |
| TRAVEL DIRECTION ORDER OFFSET |
| REVERSE TRAVEL DIRECTION OFFSET |
| MAXIMUM SPEED |
| LEFT SIDE SCENE COMMAND (MAXIMUM: 10 COMMANDS) |
| RIGHT SIDE SCENE COMMAND (MAXIMUM: 10 COMMANDS) |
FIG. 21
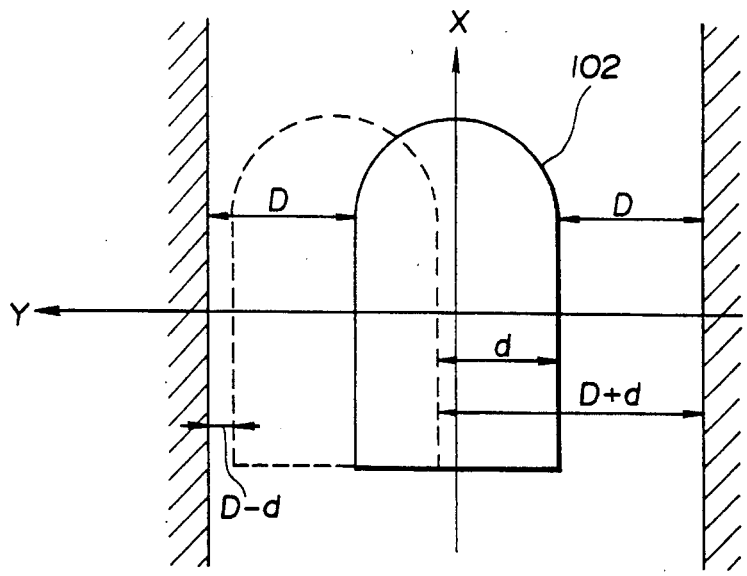

5,568,030

TRAVEL CONTROL METHOD, TRAVEL CONTROL DEVICE, AND MOBILE ROBOT FOR MOBILE ROBOT SYSTEMS

This is a divisional of application Ser. No. 07/912,977 filed Jul. 8, 1992, now U.S. Pat. No. 5,488,277, which application is a continuation of application Ser. No. 07/513,546 filed Apr. 24, 1990, now U.S. Pat. No. 5,179,329.

BACKGROUND OF THE INVENTION

1. Field of the Industrial Utilization of this Invention

This invention relates to the travel control system and device and the mobile robot in the mobile robot system applied in the field of factory automation.

2. Technical Field

With the recent development of factory automation, various kinds of mobile robots applied in this field were developed and put into practice. In this mobile robot system, the control station directs the destination and an operation to be preformed at the destination to each mobile robot by radio or by wire. The mobile robot which received the direction from the control station travels automatically to the directed position, executes directed operations there upon arrival, and waits for the next direction when the operation is completed.

Since the mobile robot of this kind travels by searching the possible routes and deciding for itself, the more mobile robots in operation, the more difficult the decision of the route to be followed for operators or for other robots.

Therefore, the manner by which collision between automatically travelling robots can be prevented poses a great problem.

SUMMARY OF THE INVENTION

The object of this invention is to provide the travel control method and the travel control device in the mobile robot system wherein many mobile robots traveling in the same site travels smoothly without collision.

Another object of this invention is to provide a mobile robot which is able to travel smoothly by checking the map or the scene information by itself.

In this invention, a reservation table for storing predetermined travel routes for each mobile robot is equipped in the control station. Each mobile robot starts traveling after the reservation of a travel route in the reservation table, and if the reservation cannot be made, that is to say, if another robot has already made a reservation in advance, the mobile robot does not travel on that route. By this system, collision between mobile robots is completely prevented.

The summary of the construction of this invention is as follows.

In the travel control method in the mobile robot system including a plurality of mobile robots and the control station for controlling these mobile robots, said control station (a1) directs one of the mobile robots to the destination. The mobile robot that receives this direction (b1) searches the route to the destination which is indicated by the control station and informs the result of search to the control station. Said control station which received this information (a2) reserves the travel route which said mobile robot has searched. (b2) After than, said mobile robot starts traveling automatically along searched travel route.

In this invention, in the mobile robot system comprising a plurality of mobile robots and the control station whereby each mobile robot travels by detecting nodes equipped on the travel route, said control station is provided with a collision table therein and, and nodes whereon the collision may occur in the case where there is another mobile robot on those nodes when a mobile robot passes over are stored in the collision table for each section of the travel route.

Further, in this invention, said control station is provided with an approach prohibition means which, in the case where the travel route is informed from said mobile robot, reads nodes stored in said collision table corresponding to said travel route and prohibits other mobile robots from approaching that node.

BRIEF DESCRIPTION OF THE DRAWING

FIGS. 4(a) and 4(b) are drawings showing the contents of the memory stored in the collision table 1c in FIG. 3.

FIG. 18 is a conceptual drawing showing the structure of the node number table stored in the map section 105 of the same mobile robot 102.

FIGS. 19(a) and 19(b) are conceptual drawings showing the structure of the network information table stored in the same map section 105.

FIGS. 20(a) and (b) conceptual drawings showing the structure of the scene table stored in the same map section 105.

FIG. 21 is an explanatory drawing for explaining the offset travel of the same mobile robot 102.

DETAILED DESCRIPTION OF PREFERRED EMBODIMENT

Figure 1:
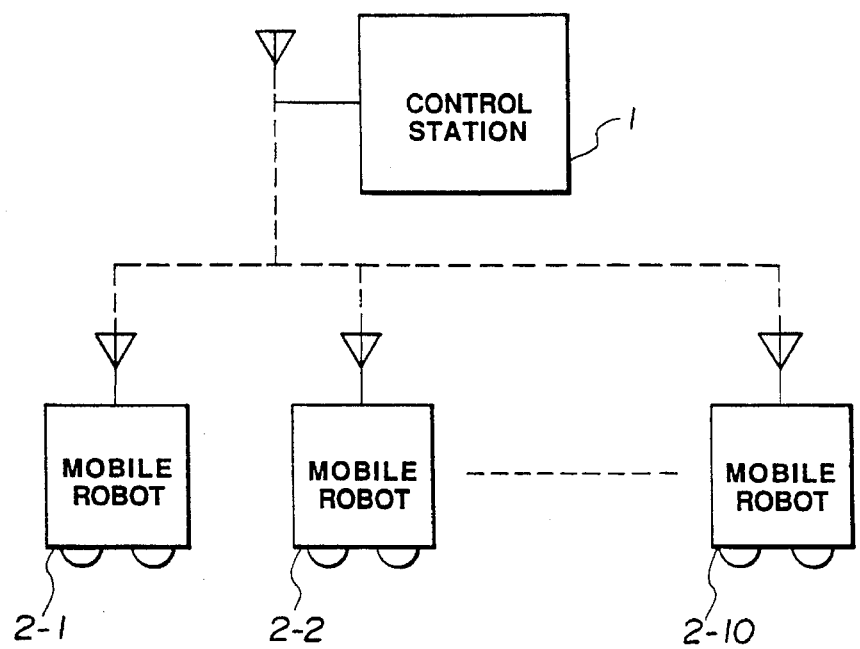
FIG. 1 is a block diagram showing the structure of the mobile robot system in the embodiment of this invention.

Referring now to the drawings, preferred embodiments of this invention will be described below in detail.

[EMBODIMENT 1]

Figure 2:
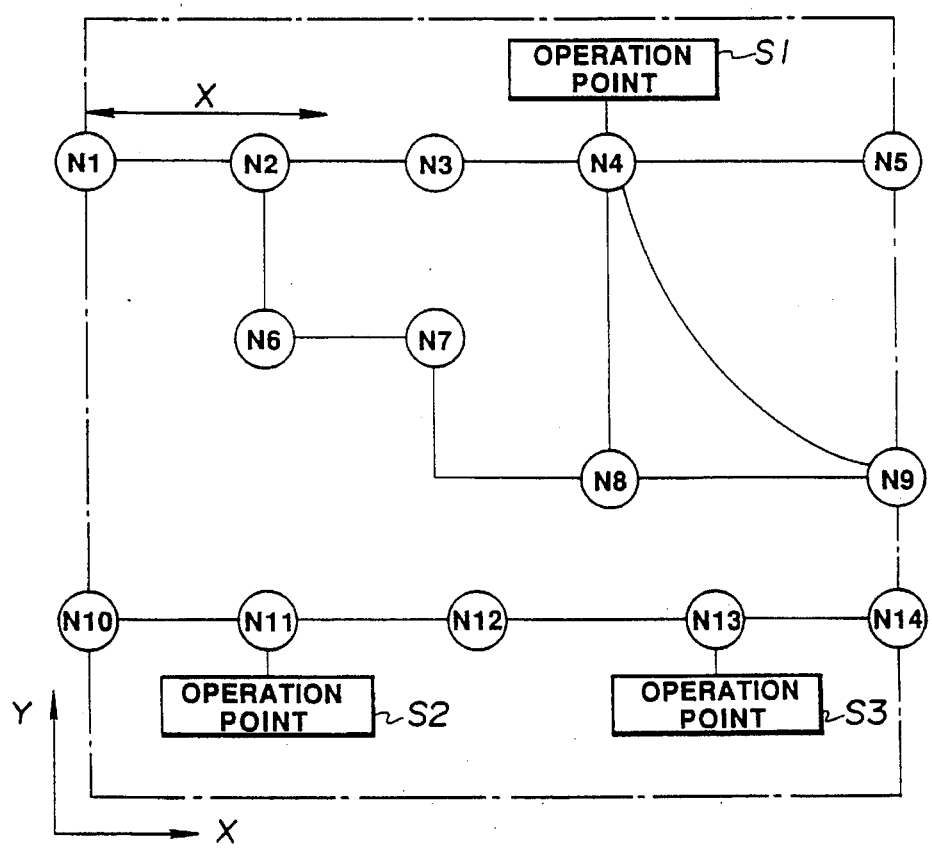
FIG. 2 is a drawing showing an example of the travel path whereon each mobile robot travels.
Figure 11:
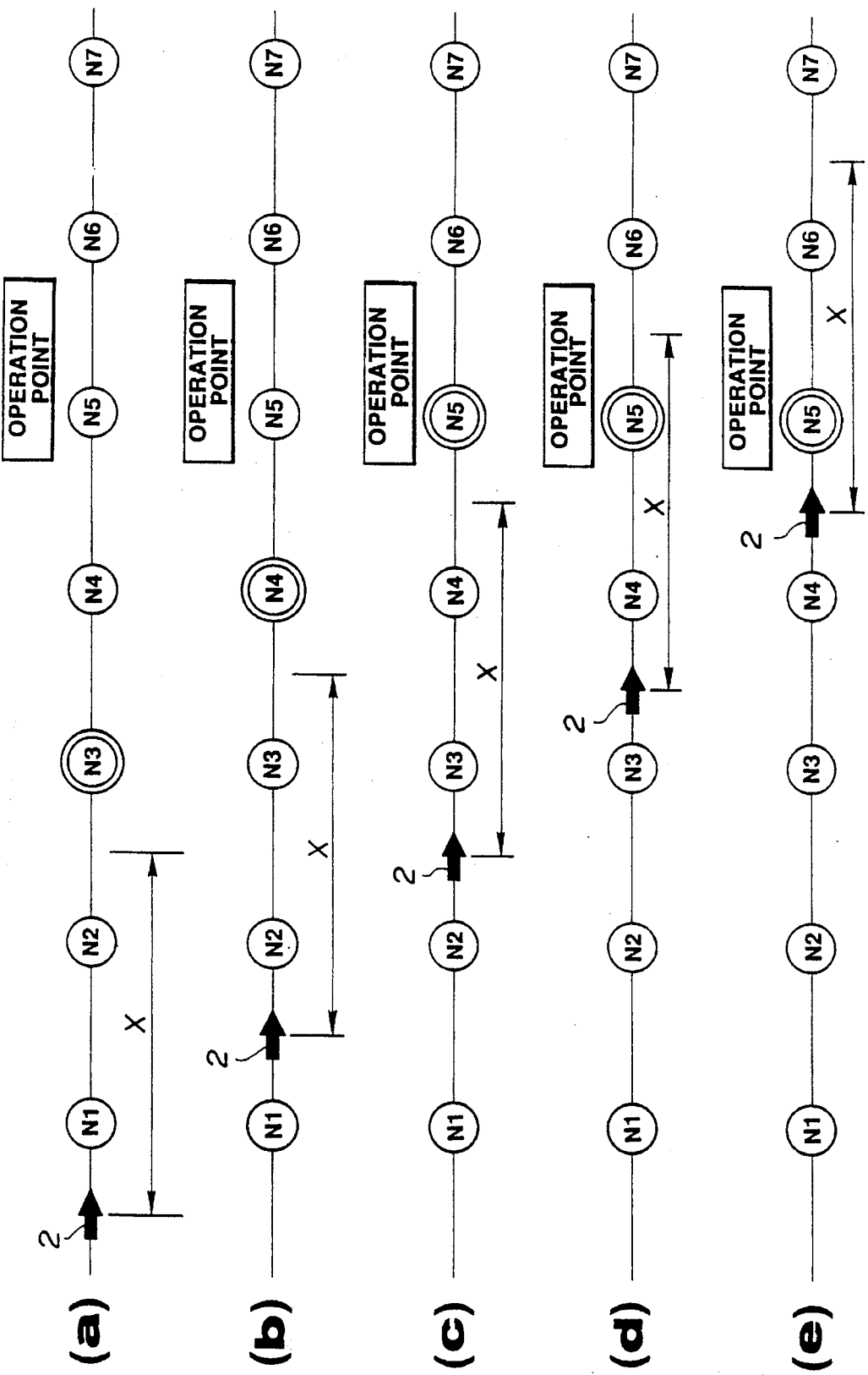
FIG. 11 is a drawing showing an example of the travel reservation.
Figure 12:
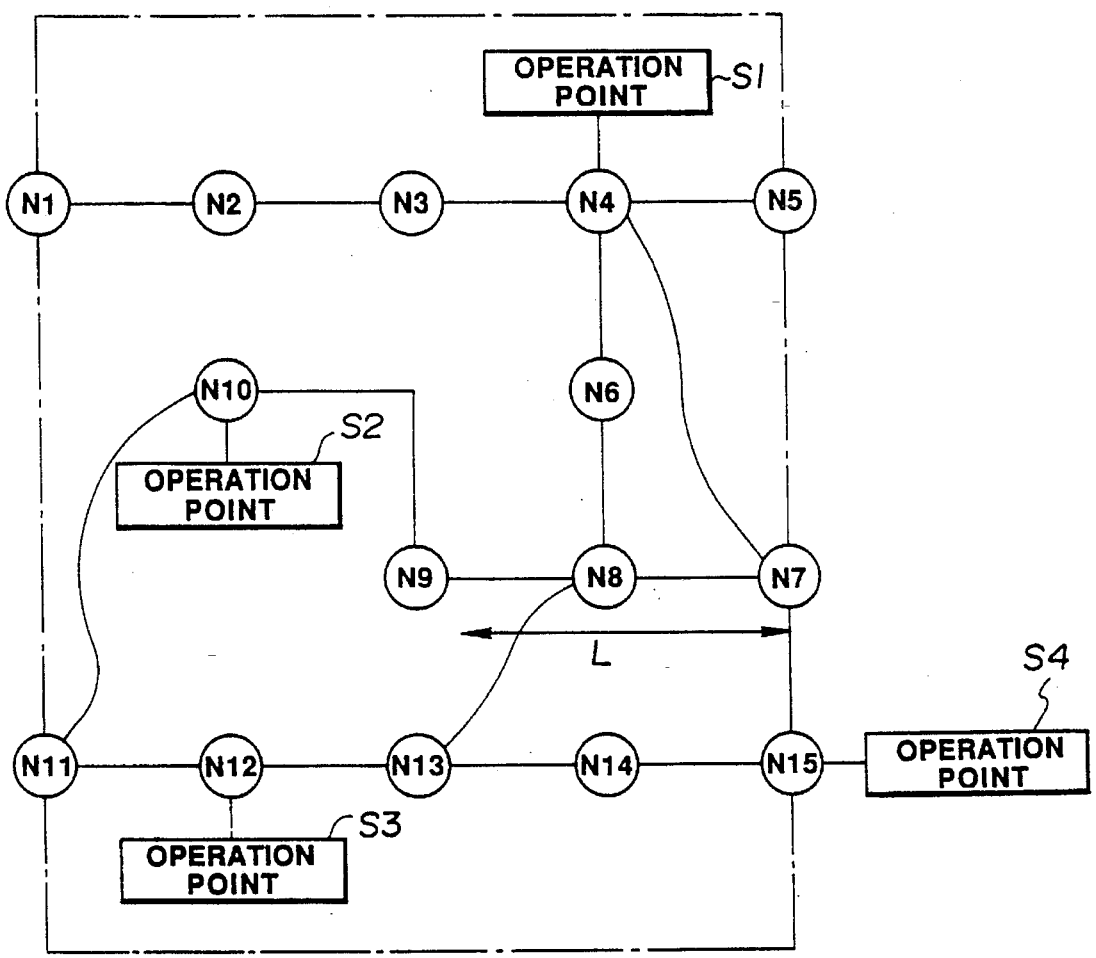
FIGS. 12, 13 and 16 are drawings showing other travel routes.

FIG. 11 is a block diagram showing an overall structure of the mobile robot in which the travel control method in this invention is applied. In FIG. 1, 1 denotes the control station and 2-1 to 2-10 denote mobile robots. The control station 1 communicates with mobile robots 2-1 to 2-10 respectively by radio. The mobile robots 2 are so constructed that they move along the magnetic tape attached on the floor surface of the predetermined travel path where nodes are set at proper intervals. In this case, nodes are the points at which the traveling states of the robots change or the points at which to observe the traveling states such as the starting point, the stopping point, branch point or operation point, which are established on the travel path. FIG. 12 shows an example of the travel path, wherein N1, N2, etc., denote nodes. At each node, a node mark is attached on the floor, and the mobile robot 2 is provided with a detector which detects these node marks. Nodes are classified into the following three types:

(1) Map approach node: The node which designates the starting point in the case where the mobile robot 2 approaches the traveling path again. The nodes N1, N5, N10 and N14 are included in this type of node.
(2) Operation node: The nodes which are provided with i operation points S1, S2 and S3. The nodes N4, N11, and N13 in FIG. 2 are included in this type of node. When the mobile robot operates, it halts at this operation node, then proceeds to the operation point S1 (or S2 or S3), stops there and begins operation.
(3) Transit node: The node over which the mobile robot passes. All nodes other than the above-mentioned are included in this type of node.

In addition, these nodes are classified by function into spinnable nodes, unspinnable nodes, nodes capable of automatic charge, and nodes incapable of automatic charge.

The "spinnable node" here means a node having a function of turning the mobile robot 2 so as to change direction. The node capable of automatic charge means the node which charges the mobile robot 2 automatically. It is also possible that one node has a spinning function, an automatic charging function, or both a spinning function and an automatic charging function.

Figure 3:
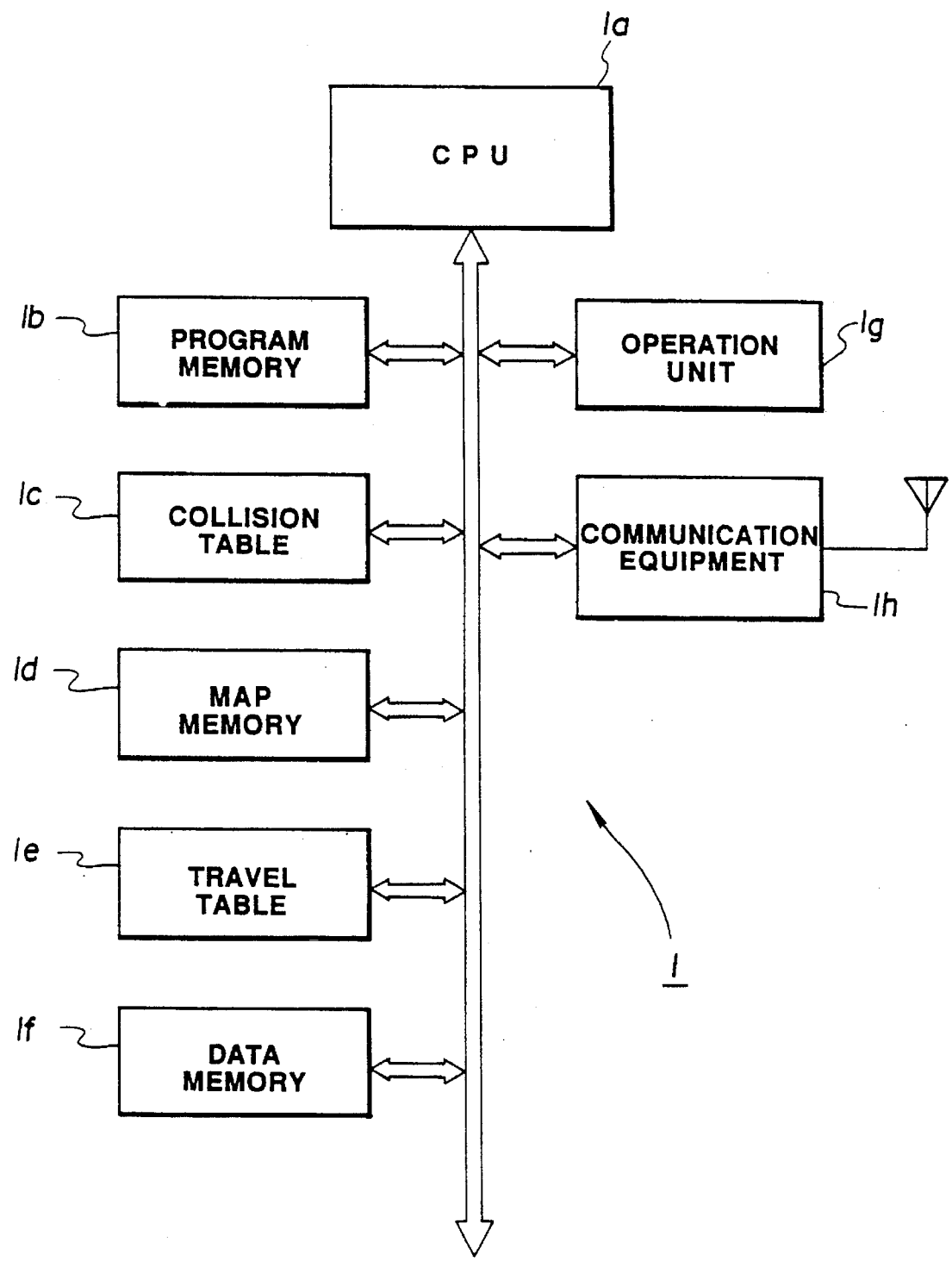
FIG. 3 is a block diagram showing the structure of the control station 1 in FIG. 1.

FIG. 3 is a block diagram showing the structure of the control station 1, wherein 1a denotes the CPU (Central Processing Unit), 1b denotes the program memory where the program to be used in CPU 1a is stored, 1c denotes the collision table which prevents collision between mobile robots 2 and 2, 1d denotes the map memory for snoring the map information, 1e denotes the traveling slate table to be used for supporting the traveling state of each mobile robot and 1f denotes the data memory for storing data (1c to 1f will be explained later). 1g denotes the final controlling element L and 1h denotes the communication device which transmits data fed from CPU 1a over a carrier of 200 to 300 MHz and receives data transmitted from the mobile robot 2-1 to 2-10 over a carrier.

Next, the conversion table 1c, the map memory 1d, the traveling state table 1e, and the data memory 1f are explained below.

(I) Collision table 1c

Figure 14:
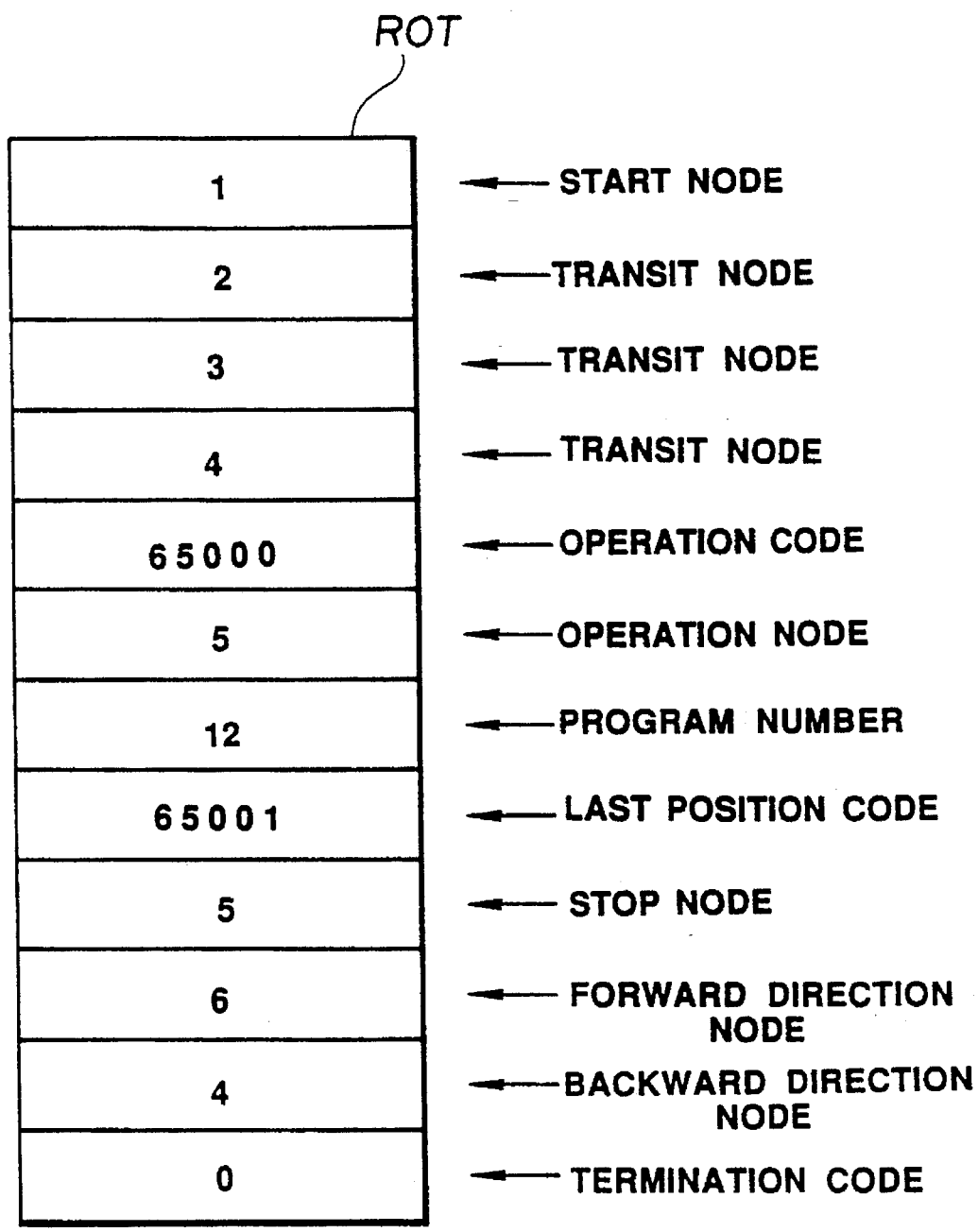
FIG. 14 is a drawing showing the structure of other route tables.

The collision table 1c, as shown in FIG. 14(a), consists of a plurality of collision data blocks. In this case, each collision data block is formed corresponding to adjacent two nodes connected by the travel path. For example, the collision data block is formed respectively for each pair of nodes (N1,N2), (N2,N3), (N3,N4), (N4,N5), (N2,N6), (N6,N7), etc., in the case of the travel path shown in FIG. 2.

Next, the collision data block is explained below in detail. For example, node numbers whereon a collision may occur, for example. when the mobile robot 2 moves from the node N2 to the node N3 (or vice versa) when any of the other mobile robots are positioned on those nodes, and the number of such nodes are written in the collision data block corresponding to the node pair (N2,N3). That is to say, the following data are respectively written in the collision data block as shown in FIG. 14(b).

(1) The start-point collision nodes numbers and the number thereof

Figure 5:
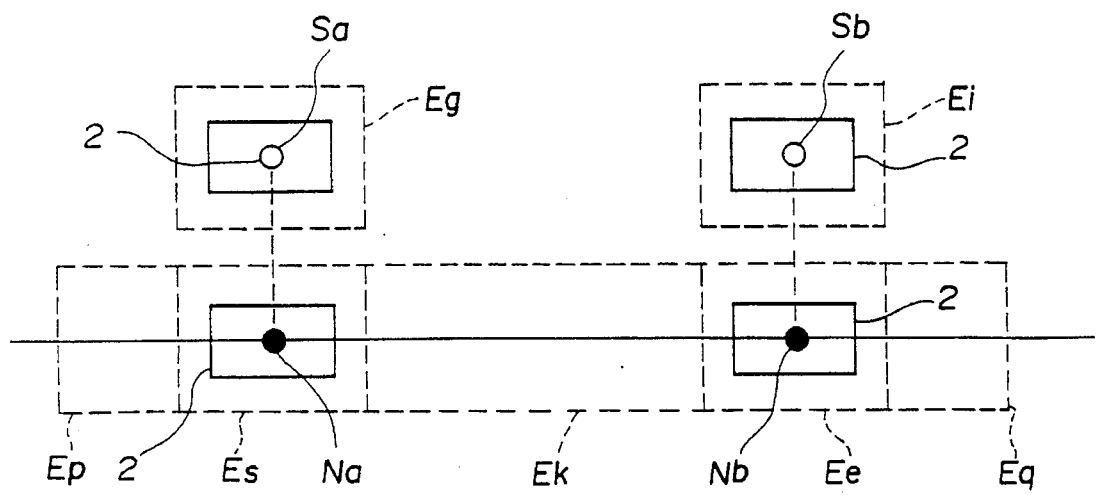
FIG. 5 is a drawing to be used for the explanation of the collision node shown in FIG. 4.
Figure 6:
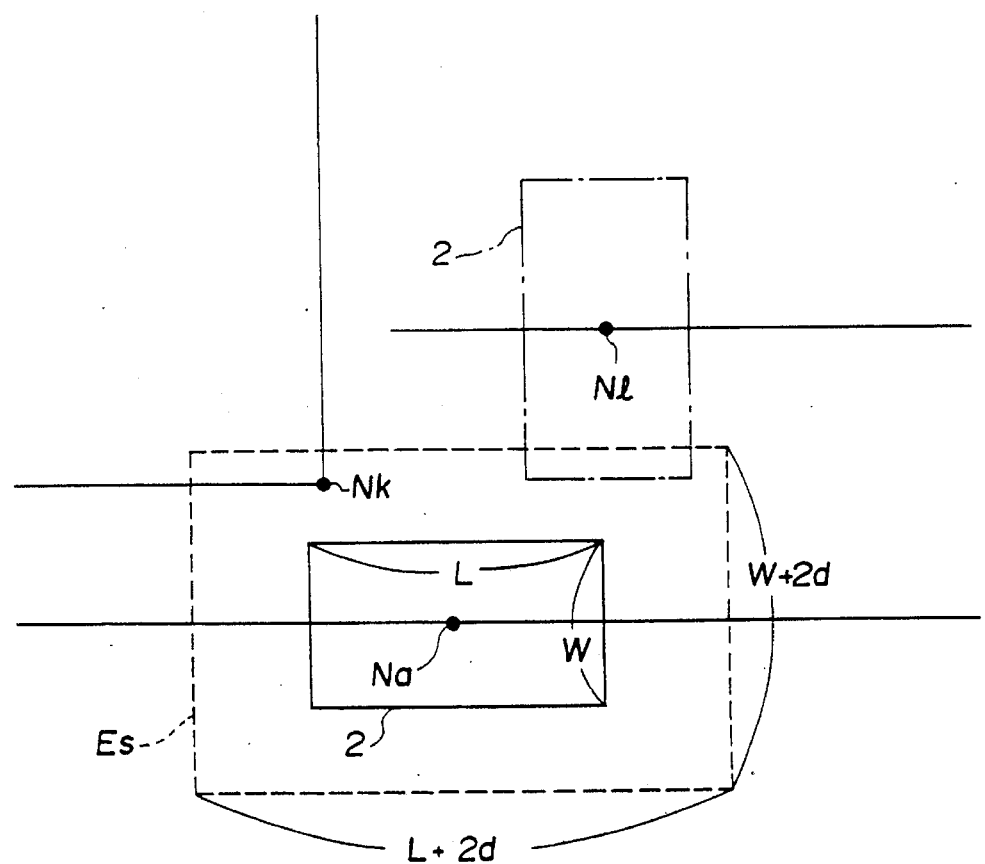
FIG. 6 is a drawing to be used for the explanation of the start-point collision node.

In FIG. 5, Na denotes the start-point node and Nb denotes the end-point node. The designation of "start-point" i and "end-point" were chosen in such a manner that one of the two adjacent nodes is arbitrarily designated the "start-point", and the other is designated the "end point". The start-point collision nodes are the nodes at which the mobile robot 2 may collide when it arrives at the start-point node Na (if there is another robot already positioned thereon). To illustrate this concretely, nodes which are positioned within the exclusive area Es are shown by the dotted line and within the range therearound. Here, the exclusive range Es is, for example, as shown in FIG. 6.
$(W+2)\times(L+2)$
W: Width of the mobile robot
L: Length of the mobile robot=150 mm
in size, which is predetermined.

The node Nk which is shown in the same figure is, of course, the start-point collision node as it is positioned within the range of the exclusive range Es. However, the node N1, which is located out of the exclusive range Es, is determined as a start-point collision node because a part of it is included within the exclusive range Es when the mobile robot 2 is in the position shown by the dashed line. The start-point node Na itself is also a start-point collision node. Consequently, in the example shown in FIG. 6, the node numbers of Na, Nk, N1 and the number of those nodes, i.e. 3, are written in the collision data block respectively.

(2) End-point collision node numbers and the number thereof

The end-point collision nodes are the nodes with which the mobile robot 2 may collide when it arrives at the end-point node Nb in FIG. 5 (if another mobile robot is positioned thereon). To illustrate this concretely, nodes which are positioned within the exclusive area Ee shown by the dotted line and within the certain range therearound. The meaning of the "certain range" is as previously described.

(3) Internode collision nodes and the number thereof

Internode collision nodes are the nodes at which the mobile robot may collide when it moves from the start-point node Na to the end-point Nb (if there is another mobile already thereon), to put concretely, nodes which are positioned within the exclusive range Ek shown by the dotted line and within the certain range therearound.

(4) Reverse traveling collision nodes and the number thereof

The reverse traveling collision nodes are the nodes at which the mobile robot (which travels from the end point to the start point) may collide when it is stopped by braking at the time of detection of the start-point node Na (if there is another mobile robot positioned thereon), and which are positioned within the exclusive range Ep shown in the figure and within the certain range therearound.

(5) Forward traveling collision nodes are the nodes at which the mobile robot (which travels from the start-point to the end point) may collide when it s stopped by braking at the time of detection of the end-point node Nb (if there is another mobile robot positioned thereon), nodes which are positioned within the exclusive range Eq shown in the figure and within the certain range therearound.

(6) Start-point operation collision nodes and the number thereof

The start point operation collision nodes are the nodes at which the mobile robot 2 may collide when it arrives at the operation point Sa in FIG. 5 (if there was another mobile robot positioned thereon), to illustrate this concretely, nodes which are positioned within the exclusive range Eg shown by the dotted line and within the certain range therearound.

(7) End-point operation collision nodes are the nodes at which the mobile robot 2 may collide when it arrives at the operation point Sb (if there is another mobile robot positioned thereon), to illustrate ibis concretely, nodes which are positioned within the exclusive range Ei shown by the dotted line and within the certain range therearound.

All of the above-mentioned data from (1) to (7) are not always stored in the collision data block. For example, if there is a operation point neither at the start point nor at the end point, the operation point collision node is of course not stored.

(II) MAP MEMORY 1d

In the map memory 1d are stored XY coordinates of each node N1, N2, etc., shown in FIG. 2, data indicative of the type of node (spinning function, automatic charging function, etc.), other node numbers which are connected to that node, distance to other nodes which are connected to that node, and the distance to other nodes which are connected to that node.

(III) TRAVELING STATE TABLE 1e

Figure 7:
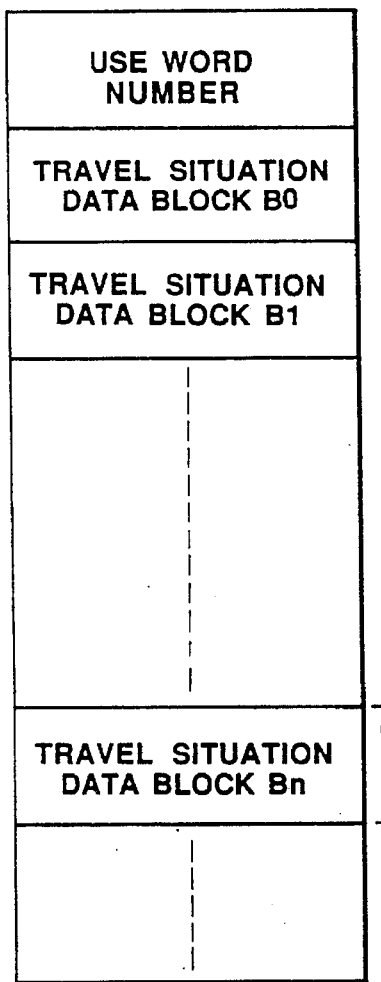
FIGS. 7(a) and 7(b) are drawings showing the contents of the memory stored in the travel state table 1e shown in FIG. 3.
Figure 7:
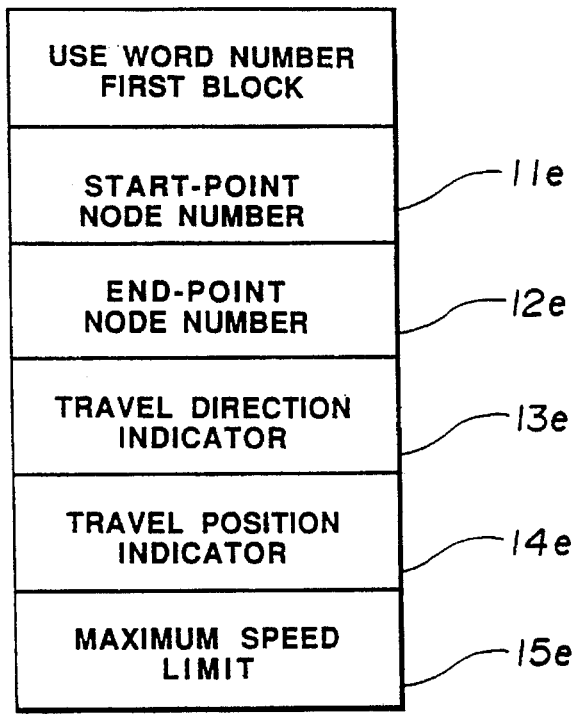

The traveling state table 1e consists of a plurality of traveling state data blocks B0, B1, etc. In this case, each traveling state data block B0, B1, etc., is formed corresponding to two adjacent nodes which are connected by a travel path. In the case of the travel path network shown in FIG. 2, the traveling state data blocks B0, B1, etc., are formed for (N1,N2), (N2,N3), (N3,N4), (N4,N5) and (N2, N6), respectively. FIG. 7(a) shows the structure of each traveling state data block B0, B2, etc. Each traveling state data block B0, B2, etc., consists of a start-point node number area 11e, a end-point node number area 12e, a field of traveling direction command 13e, traveling figure command area 14e, and a field of maximum speed 15e.

The following data is written in each area (11e to 15e) of the traveling state data block B0, B2, etc., respectively.

(A) START-POINT NODE NUMBER AREA 11e, AND FIELD OF END-POINT NODE NUMBER AREA 12e

The start-point node numbers are written in the area the start-point node number area 11e and the end-point node numbers are written in the field of the end-point node numbers area 12b, respectively. For example, in the case of the traveling state data block corresponding to the node pair (N4,N5) in FIG. 2, the node N4 is the start-point node and the node N5 is the end-point node. Therefore, the number N4 is written in the start-point node number area 11e, and the number 5 is written in the end-point node number area 12e in the corresponding traveling state data block, respectively. The designations of "start-point" and "end-point" are determined such that one of the two adjacent nodes is arbitrarily designated the "start-point", and the other is designated "end-point".

(B) TRAVELING DIRECTION COMMAND AREA 13e

The traveling direction command area 13e is the area to command the passing direction between two adjacent nodes (one-way or both-ways). In this example, "0" written in the traveling direction command area 13e means no one-way command; "1" written therein means a one-way command from the start-point node to the end-point node; and "2" written therein means a one-way command from the end-point node to the start-node.

(C) TRAVELING FIGURE COMMAND AREA 14e

The traveling figure command area 14e is the area to command the figure as to the direction (forward, backward, or transverse) which the mobile robot 2 should take when it travels between two adjacent nodes. In this example, "0" written in the traveling figure command area 14e means a command of forward and backward movement, and "1" written therein means a command of transverse movement.

(D) SPEED LIMIT AREA 15e

The maximum speed to travel between nodes is written in the area maximum speed 15e.

(IV) DATA MEMORY 1f

Figure 8:
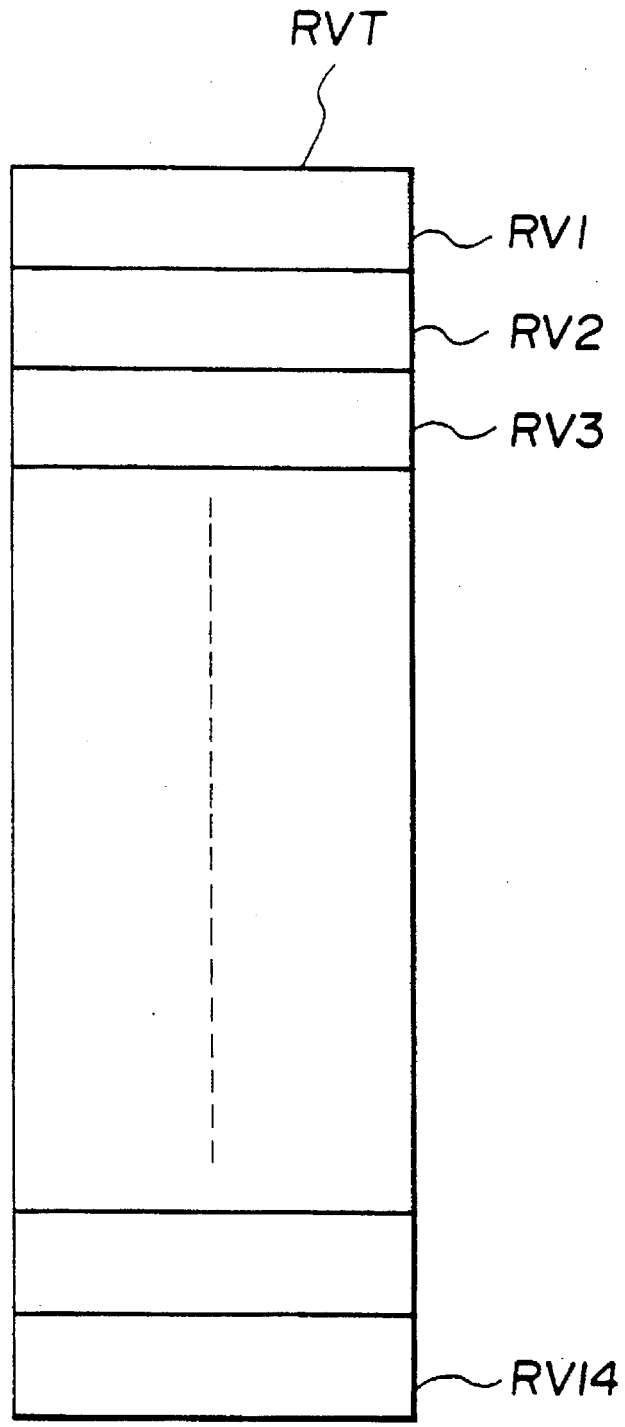
FIG. 8 is a drawing showing the reserve table RVT which is set in the data memory 1f in FIG. 3.

The above-mentioned data memory 1e is provided with a reserve table RVT shown in FIG. 8 in advance. The reserve table RVT has memory slots RV1 to RV 14 (1 byte each) corresponding respectively to the node N1 to N14.

Figure 9:
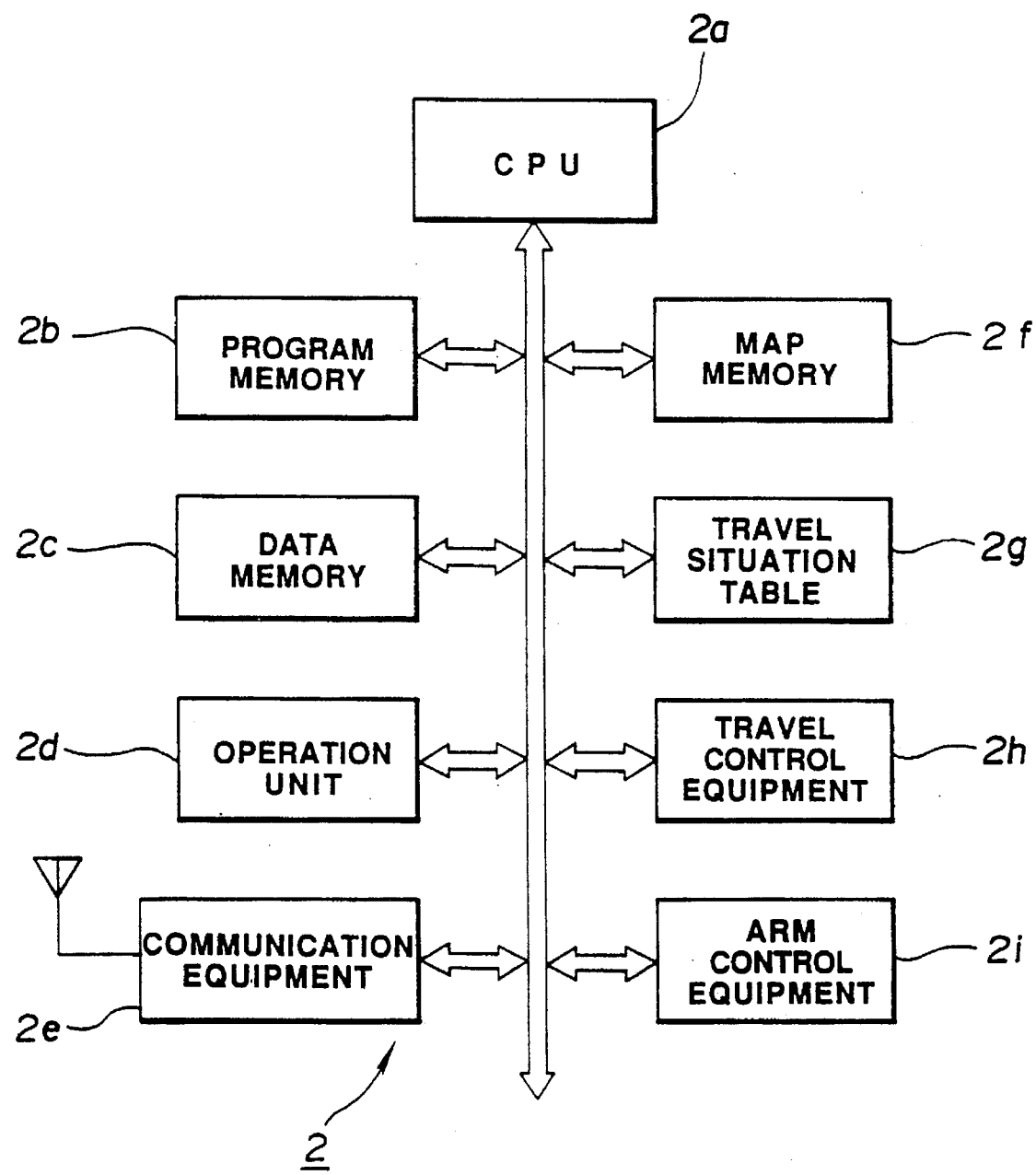
FIG. 9 is a block diagram showing the structure of the mobile robot 2.

Next, the mobile robot 2 is explained below. FIG. 9 is a block diagram showing the structure of the mobile robot 2, wherein 2a denotes the CPU, 2b denotes the program memory wherein the program to be used in CPU 2a is stored, 2c is the data memory for storing data, 2d is the final controlling element, 2e is the communication device, 2f is the map memory wherein data having the same content as the map memory 1d in the control station 1 is stored, and 2g denotes the traveling state table wherein data which is the same as the traveling state table 1e in the control station 1 is stored. Said data to be stored in the map memory 2f and the traveling state table 2g are respectively prepared in the control station 1 and transferred to each mobile robot 2 via an IC card as the medium. 2h is the travel control device, responsive to travel data (destination data, traveling state data, traveling speed data, etc.) supplied from CPU 2a, controls the drive motor while detecting the magnetic tape and node mark on the floor by the magnetic sensor, causes the mobile robot 2 to travel to the target node, detects the distance from the last node over which the mobile robot passed to the present position, based continually on the output of the encoder attached on the axle and feed data indicative of the distance (hereinafter referred to as position data DD) to CPU 2a. 2i denotes the arm control means which receives the operation program number supplied from CPU 2a, reads the operation program of said number from the internal memory upon arrival of the mobile robot at the operation node, and controls the robot arm (not shown in the figure) by said read program to cause it to carry out various operations.

OPERATION EXAMPLE 1

Next, the action of the above-mentioned mobile robot system is explained by using the example of the travel path in FIG. 2. First, what is required in order to put the mobile robot 2 under the control of the control station 1 is to transfer the mobile robot 2 manually to any of the map approach nodes N1, N5, N10, or N14, then input the node number and switch to the automatic mode via the final control element 2d of the mobile robot 2. When the node number is input, CPU 2a sends the node number and the robot number to the control station 1 via the communication device 2e. The control station 1 receives the robot number and node number and writes it in the data memory 1e. By these steps, the control station 1 detects the robot number which is newly approaching, and the position thereof.

Figure 10:
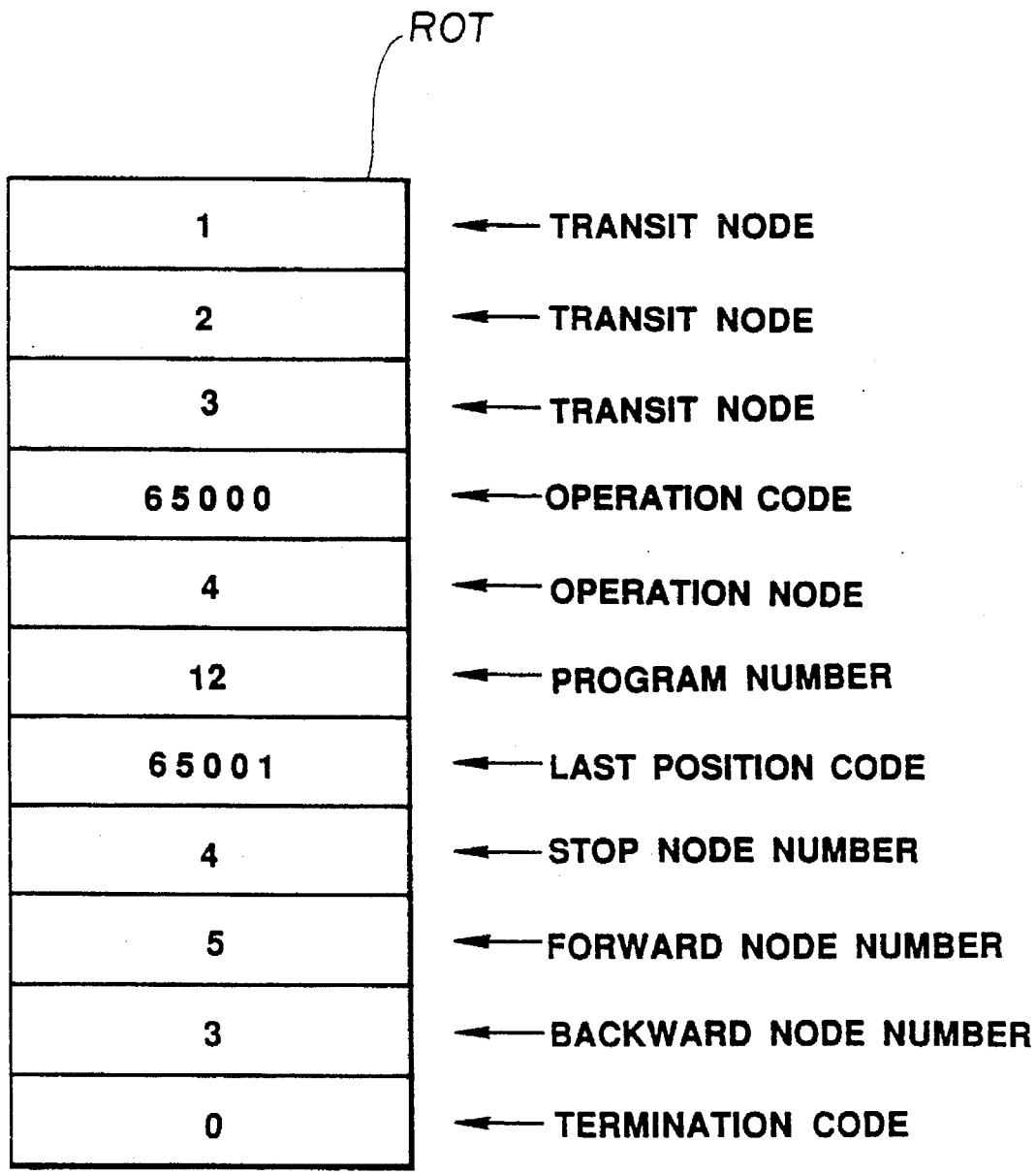
FIG. 10 is a drawing showing the structure of the route table ROT which is set in the data memory 2c of the mobile robot.

When there is any operation to be performed at the operation point S1, for example, the control station 1 sends the operation point code indicative of the operation point S1 and the operation program number to the mobile robot which is positioned at the nearest point from the operation point. Suppose that the mobile robot 2-1 is slopped at node N1 and the control station 1 sends the operation point code and the program number to the robot 2-1, CPU 2a of the mobile robot 2-1 stores the received operation point cede and the traveling route to the operation point S1. This route search is carried out by the already known vertical search method. When the route N1→N2→N3→N4 is searched by this route search, CPU 2a prepares the route table ROT shown in FIG. 10 in the data memory 2c and sends the prepared route table ROT to the control station 1.

In this route table ROT are written, as shown in said figure, the node numbers over which the robot must pass in order to go to the target operation node, the operation code showing that the following data indicates an operation, the operation node number, the operation program number, the final figure code showing that the following data indicates the final figure of the robot, and the code showing the end of the route table ROT.

The control station 1 writes this route table ROT within the internal data memory if, and successively sends the same table ROT to other mobile robots 2-2 to 2-10. Other mobile robots 2-2 to 2-10 write the same table ROT within the internal data memory 2c respectively. Then CPU 2a accumulates the searched travel distance of the route in order from the starting point node N1 to the target node N4, and detects the first node which exceeds the predetermined regular distance X (refer to FIG. 2). Suppose now that the node mentioned above was 3. Next, CPU 2a sends the node numbers N1, N2, and N3, and the route-reserve request code, respectively, to the control station 1.

CPU 1a of the control station 1 receives these node numbers and the route-reserve request code, reads the start-point collision node, end-point collision node, internode collision node, and forward travel collision node, from the collision data block corresponding to the node pair (N1,N2) in the collision table 1c, then checks whether or not these nodes are already reserved by the reserve table RVT. If not, in other words, if the data in the memory slots RV1 to RV14 of the reserve table RVT corresponding to these nodes are "0", the CPU writes the robot number "1" respectively to those memory slots. By this process, the route N1→N2 is reserved.

Next, CPU 1a of the control station 1 reads the start-point collision node, end-point collision node, internode collision node, and forward-travel collision node from the collision data block corresponding to the node pair (N2,N3) in the collision table 1c in the same manner as described above, and checks if these nodes are already reserved or not. If not, the CPU 1a sends the node numbers N1 to N3 and the reserve completion code to the mobile robot 2-1. The mobile robot 2-1, responsive to these node numbers and the reserve completion code, starts traveling first to the node N2.

The mobile robot 2-1 sends the following data successively to the control station 1 in the course of traveling.
*Condition data: Data indicative of the present condition of the robot (traveling, waiting, operating, abnormal condition, etc.)
*Present position data: Data indicative of the present position of the robot.

The control station 1 sends the condition data and the present position data DD sent from the mobile robot 2-1 and the following data to other mobile robots 2-2 to 2-10.
*Reserve node data: Data indicative of the node which is presently reserved by the mobile robot 2-1. The mobile robots 2-2 to 2-10 writes the received data into the internal data memory 2c.

The control station 1 constantly checks the present position data DD sent from the mobile robot 2-1 and cancels the reservation of the route N1→N2 at the time when the mobile robot 2-1 passes over the node N2; in other words, it changes the robot number "1" written in the reserve table RVT at the reservation of the route N1-N2 back into "0".

On the other hand, the mobile robot 2-1 always detects the first node beyond the distance X for the target node from the present position according to the distance between nodes snored in the present position data DD and the map memory 2f and sends the node numbers N3 and N4 and the route reservation code, respectively, to the control station 1. The control station 1, responsive to these node numbers and the route reservation request code, reserves the node according to the data in the collision data block corresponding to the note pair (N3,N4) in the collision table 1c. When the node reservation is complete, the control station 1 sends the node numbers N3 and N4 and the reservation completion code to the mobile robot 2-1. The mobile robot 2-1, responding to these node numbers and the reservation completion code, travels to the node N4. When the mobile robot 2-1 passes over the node N3, the reservation of the route N2→N3 is canceled in the control station 1 in the same manner describe above. When the mobile robot 2-1 arrives at the node N4, it proceeds to the operation point S1 transversely. When the mobile robot 2-1 arrives at the operation point S1, the reservation of the route N3→N4 is canceled, provided that the end-point operation collision node is not canceled in this case.

In the process above, for example, suppose that the reservation up to the node N3 was made by that of the route N3→N4 could not be made. This could happen in the case, for example, where the mobile robot 2-K to be traveled on the node N5→N4→N8 has already reserved the same route. In this case, the mobile robot 2-1 stops upon passing over the node N3 and waits there by sending the route reservation request code to the control station 1 repeatedly. When the mobile robot 2-K passes over the route N4→N8, the control station 1 cancels the reservation of the route N4→N8, the reserves the routes N3→N4 which is requested by the mobile robot 2-1, whereby the mobile robot 2-1 can advance.

In the case where only the reservation of the route N1→N2 could make the reservation request of the route N1→N2→N3, but that of the route N2-N3 could not be made, the control station 1 transmits the reservation completion of the route N1→N2 no the mobile robot 2-1. In this case, the mobile robot N2→N1 starts traveling on the route N1→N2 and makes a reservation request for the nodes after the node N3 during travel.

As explained so far, this mobile robot system is provided with the reserve table RVT in the control station 1 and each mobile robot 2 starts traveling after making the reservation to the reserve table RVT. Therefore, when there is another mobile robot on the expected travel route or when another mobile robot is approaching the expected travel route, the route reservation cannot be made, consequently, there is no possibility of collision with other mobile robots 2.

OPERATIONAL EXAMPLE 2

FIG. 11 shows another example of the above-mentioned reservation condition, wherein 5 denotes the target operation node and the node with a double circle denotes the reserved node positioned at the farthest position. When the mobile robot 2 comes to the position (a), the reservation is made for the nodes N1 to N3; when it comes to the position (b), the reservation is made until the node N4; and when in comes to the position (c), the reservation is made until the node N5, and the reservation after N5 cannot be made even when he mobile robot 2 is moved to the position (d) or (e).

As explained above, in this mobile robot system, each mobile robot travels by making reservations of nodes within the range from the present position to the regular distance X and the first node beyond the distance X. In this case, he shorter the distance X is, the less it disturbs the travel of other robots. However, if the distance X is too short, smooth travel cannot be made. Therefore, it is required to select the shortest distance X whereby smooth travel can be made.

The period from the time the mobile robot 2 sends the reservation request to the control station 1 until it receives the result of the reservation is, considering the communication delay and processing delay, about 5 seconds. The mobile robot travels about 2100 mm in 5 seconds at a speed of 1.5 km/hr. Therefore, it seems to be adequate to determine the above-mentioned distance X to be 3000 mm. In this case, the range which can be reserved is actually from the present position to about 3,500 mm ahead in the direction of advance.

As the above-mentioned reservation is made in the units of nodes, the reservation range becomes larger when the distance between nodes is great. In this case, the distance between nodes can be adjusted so as not to exceed the specified value by setting dummy nodes.

OPERATIONAL EXAMPLE 3

The example wherein the map approach node judging data is stored in the map memory 1d in addition to the above mentioned XY coordinates of each node is explained below. The map approach node judging data here is the data indicating if the node is the map approach node or not. In this example, when a certain node is the map approach node, the contents of the map approach node judging data corresponding to that node is set to "1", and when a certain node is not the map approach node, the contents of the map approach node judging data corresponding to that node is set to "0". A traveling mobile robot cannot approach the node whereof the contents of the map approach node judging data is "1".

Referring now to the travel path shown in FIG. 12, an example of the action of the mobile robot system in the case where the map approach node judging data is set for "1" is explained below. Suppose that the node N7 is set as a map approach node in the travel path in the same figure. In this case, when an operation to be performed occurred at the operation point S4, for example, the control station 1 sends the operation point code indicative of the operation point S4 and the operation program number to the mobile robot 2-K positioned at the operation point S1 which is the nearest to the operation point S4. CPU 2a of the mobile robot 2-K stores the received operation point code and the program number in the data memory 2c, then carries out the search of the travel route up to the operation point S2 by the above-mentioned vertical search method, or the like. in this case, the shortest route from the operation point S1 to the operation point S2 is N4→N7→N15, however, since the node N7 is already set as the map approach node (since the contents of the node N7 of the map approach node judging data in the map memory 2f is "1"), it is excluded from the objects of the route search. As a result, the shortest route N4→N6→N5→N13→N14→N15, excluding the node N7, is searched. The explanation of the action procedure to travel on this route is omitted since it is the same s the explanation in the Operational Example 1, and the Operational Example 2.

When the node N7 is not set as the map approach node, the node N7 is simply a transit node (in this case, the contents of the node N7 in the map approach node judging data in the map memory 2f is "0"). Therefore, when the mobile robot 2-K at the operation point S1 travels to the operation point S4, the route N4→N7→N15 is searched by the vertical search method, or the like.

In this way, in the mobile robot system in this example, the map approach node is excluded from the searching objects, the mobile robot 2 on the travel path does not pass over that node, consequently the collision with another mobile robot sent to said approach node could not happen.

The map approach node can be set or canceled easily by suitably rewriting the contents of the map approach node judging data in the map memory 2f according to the operation condition.

OPERATIONAL EXAMPLE 4

The mobile robot system, in the case where another mobile robot 2 is positioned on the travel path of a mobile robot 2, due to reasons such as waiting, operating, abnormal condition, and disturbing the travel of said mobile robot 2.

Figure 13:
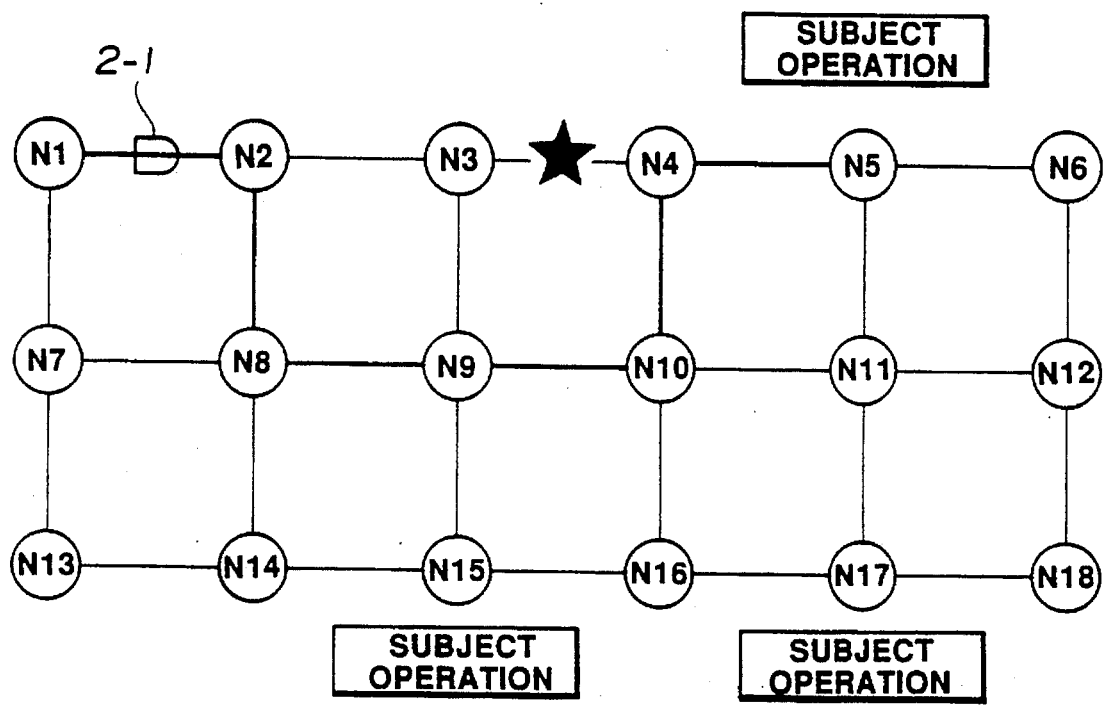

In the travel path showing FIG. 13, for example, when the operation to be carried out at the operation node N5 occurs, the control station 1 sends the operation point node code indicative of the operation program number to the mobile robot 2 which is positioned at the nearest point from said operation node. Now suppose that the mobile robot 2-1 is halted at the node N1 and the control station 1 sends the operation node code and the program number to the mobile robot 2-1. CPU 2a of the mobile robot 2-1 stores the received operation node code and the program number in the data memory 2c, then searches the travel route until the operation node N5. This route search is carried out by the already known vertical searching method, or the like. When the route N1→N2→N3→N4→N5 is searched by said route search, CPU 2a prepares the route table ROT shown in FIG. 14 in the data memory 2c, and sends the prepared route table ROT to the control station 1.

In this route table ROT are written, as shown in the same figure, "1" which is the number of the starting point node N1; "2", "3", and "4" which are the numbers of the nodes N2, N3, and N4 over which the mobile robot 2 is to pass sequentially when going to the target operation node N5; the operation code "65000" indicating that the following data concerns the work; "5" which is the number of the operation node N5; the operation program number "12"; the final figure code "65001" indicating that the following data shows Eke final figure of the robot; "5" which is the number of the node N5 where the robot stops; "6" which is the number of the forward node N6; "4" which is the number of the backward node N4; and the final code "0" which shows the end of the route table ROT.

The subsequent processes are omitted because they are the same as explained in Operational Example 1 and Operational Example 2.

Here, the process which should be taken when the mobile robot 2-1 cannot advance for any other reason is explained below.

For example, if the node N3 cannot be reserved at the time when the mobile robot 2-1 arrives at the node N2, the robot is halted at the node N2 immediately, and the following process is performed.
(1) Scan the route table ROT of other mobile robots 2-2 to 2-10 which are stored in the data memory 2c to detect the mobile robot 2 having the travel route including the node N3. Suppose now that the mobile robots 2-3 and 2-5 satisfy the above-mentioned condition.
(2) Detect the mobile robot 2 which is reserving the node N3 in respective reserve node data of the mobile robots 2-3 and 2-5. Suppose now that the mobile robot 2-3 was detected.
(3) Next, detect the condition of said mobile robot 2-3 in the condition data of the mobile robot 2-3 stored in the data memory 2c and carry out the following process according to the condition detected.

(i) When the mobile robot 2-3 is in :he waiting condition

The mobile robot 2-1 sends the condition data thereof as "waiting for the completion of purge" to the control station 1. The control station 1 receives this condition data, finds the mobile robot 2-3 which is waiting according to the route table ROT of each mobile robot 2-2 to 2-10 and the position data which are stored in the internal data memory 1f and sends the command of route to transfer and the command of the node to move to the mobile robot 2-3. The mobile robot 2-3 which received the route command in the same manner as shown above, searches the route to the command node, reserves the route and travels to said node. When the mobile robot 2-3 is moved, the node reservation is canceled. On the other hand, the mobile robot 2-1 sends the travel path reservation request to the control station at regular intervals after sending the condition data as "waiting for the completion of purge" to the control station 1. The control station 1 reserves the mobile robot 2-1 and sends the reservation completion to the mobile robot 2-1 at the time when the mobile robot 2-3 is moved and the node reservation is canceled. The mobile robot 2-1 receives said reservation completion and begins traveling. In the case where the route research command is sent again from the control station 1, the robot carries out the route search and changes the travel route.

(ii) WHEN THE MOBILE ROBOT 2-3 IS TRAVELING TOWARD SAID NODE

The mobile robot 2-1 sends the condition data to the control station 1 as "waiting for passage", and waits for the reservation completion while sending the travel path reservation request to the control station 1 at regular intervals. If any abnormalities occur during the passage of the mobile robot, it carries out the alternate route search which is explained in (iv) below and changes the travel route.

(iii) DURING ABNORMAL CONDITIONS

Figure 15:
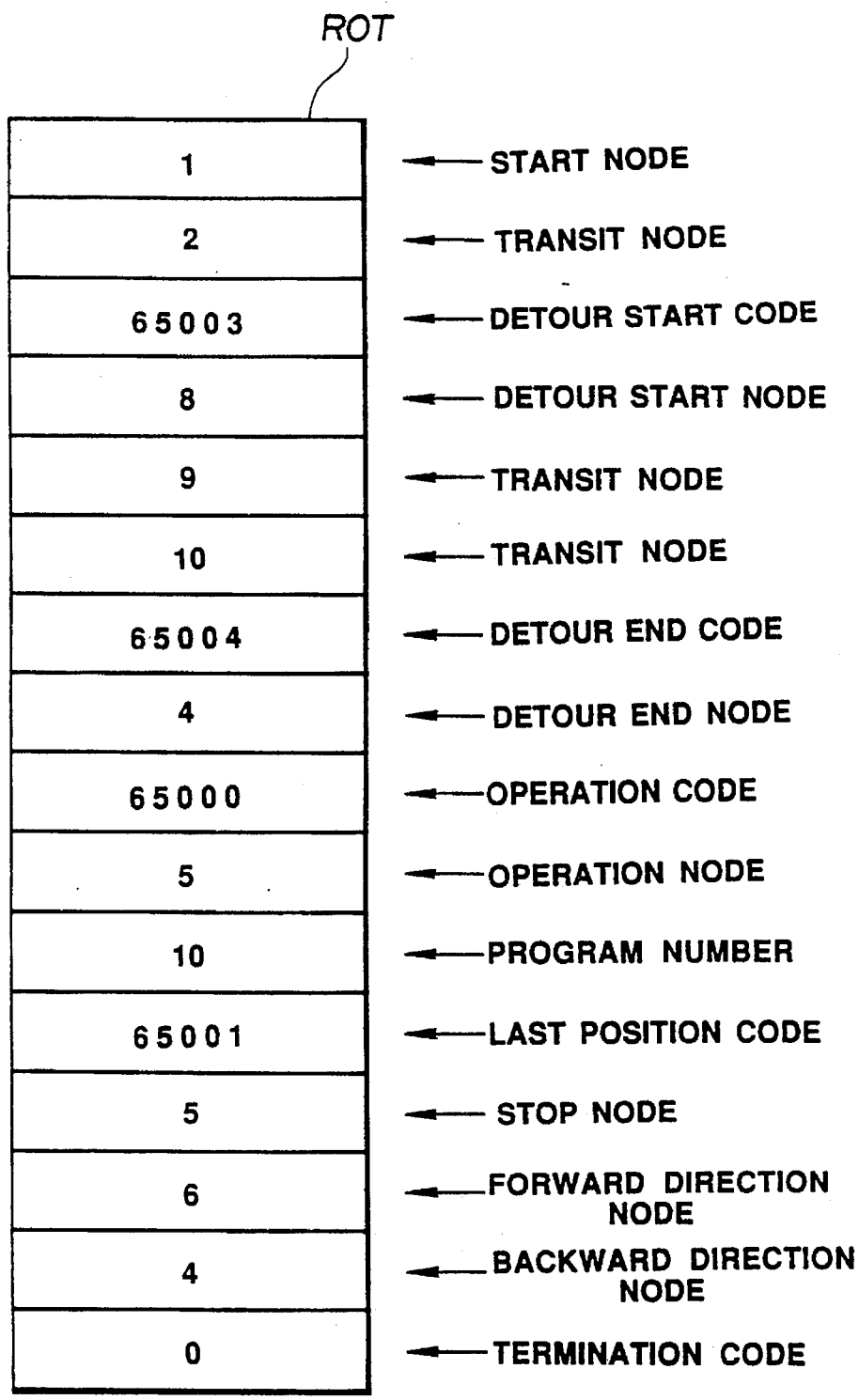
FIG. 15 is a drawing showing the structure of the route table for the case in which an alternate route is taken

The mobile robot 2-1 carries out the route research again. That is to say, the mobile robot sends a request for route search approval first. The control station 1 responds to this request, sends the route-search approval to the mobile robot 2-1 when there is no other mobile robot 2 under route search. The mobile robot 2-1, responding to this route-search approval, searches the alternate route for the mobile robot 2-3. When the route is found, in the same manner an mentioned above, CPU 2a of the mobile robot 2-3 prepares the route table ROT shown in FIG. 15 in the data memory 2c and sends the prepared route table ROT to the control station 1.

In said route table ROT are written, as shown in the same figure, the detour start code "65003" showing the start of a detour; "8" which is the number of the detour start node N8; "9" and "10" of the nodes N9 and N10 to be passed sequentially; the detour termination code "65004" indicative of the termination of a detour; "4" which is the number of the detour termination node N4; the operation code "65000" indicative of the operation command; "5" which is the number of the operation node NS; the operation program number "10" indicative of the operation program; the final figure code "65001" indicating that the following data shows the final figure of the mobile robot 2; "5" which is the number of the node N5 where the robot is to be halted; "6" which is the number of the forward node N6; and "4" which is the number of the backward node N4 and the final code "0" indicative of the end of the route table ROT. The control station 1 sends said route table ROT to other mobile robots 2-2 to 2-10. Next, the mobile robot 2-1, in the same manner as mentioned above, sends the route reservation request to the control station 1 and begins traveling upon reception of the reservation completion from the control station 1. Then the mobile robot 2-1 travels on the alternate route according to the route table ROT (FIG. 15) and performs the operation according to the operation procedure shown in the program number "10" after arriving at the operation node N5.

In the case where the mobile robot 2-1 could not search the alternate route, it sends the condition data to the control station 1 as "waiting to recover from abnormality" and waits until the route is ready to pass.

(iv) WHEN THE MOBILE ROBOT 2-3 IS WORKING

In the same manner as mentioned above, the mobile robot 2-1 finds a route to avert the mobile robot 2-3 by the route search and changes the path of travel to this route. When an alternate route could not be found, it sends the condition data to the control station 1 as "waiting for the termination of work", and waits until the route is ready to pass.

(v) SOLUTION OF COMPETITIVE PROBLEMS

The solution of competitive problems indicates the case where the mobile robot 2-3 is under one of the conditions "waiting for the completion of purge", "waiting for the completion of work", "waiting for passage", or "waiting for recovery from abnormality" In these cases, the mobile robot 2-1 sends the condition data to the control station 1 as under the solution of competitive problems" and waits for the solution of the problem concerning the mobile robot 2-3.

As explained so far, each mobile robot 2-1 to 2-10 in this mobile robot system judges by itself if it waits or changes the route when it cannot travel or act in the most suitable way. Therefore, the travel control of each mobile robot is made by 1 versus N, and consequently the improvement of the controlling efficiency is anticipated.

OPERATIONAL EXAMPLE 5

The reservation request in the alternate route that the mobile robot 2-1 makes for the control station 1 was the same as the case of the reservation request of the normal travel route, while the reservation request in the alternate route can be made simultaneously for all the nodes in the alternate route.

In this case, CPU 2a of the mobile robot 2-1 sends all the numbers of the nodes N8, N9, N10, and N4 (FIG. 13) existing between the detour initiation node to the detour termination node and the route reservation request codes respectively to the control station 1. CPU 1a of the control station 1, upon reception of the node numbers of all the nodes in the alternate route and route reservation request codes, checks if these codes are already reserved or not by the reserve table RVT. For nodes which are not reserved, it writes "1" which is the number of the mobile robot 2-1 in the corresponding memory slot in the reserve table. While, if there is any node which is already reserved by other mobile robots 2, it waits for the cancellation of the reservation of said node. In this way, upon completion of the reservation or all the nodes where to the reservation is requested, the control station 1 sends the reservation completion code to the mobile robot 2. The mobile robot 2-1, responsive to the reservation completion, starts traveling and travels on the alternate route according to the route table ROT shown in FIG. 15, and after it arrives at the operation node N5, performs the operation according to the operation procedure shown in the program number "10". As explained so far, therefore, each mobile robot 2-1 to 2-10 in this mobile robot system, when traveling on the alternate route, can prevent the occurrence of new causes of detour during travel on the alternate route because said robot starts traveling on the alternate route after the reservation is made for all alternate routes; consequently, the confusion of travel during a detour can be prevented.

OPERATIONAL EXAMPLE 6

Now, other examples of "waiting for completion of purge" process are explained below referring to the travel path in FIG. 2.

Now suppose that the mobile robot 2-1 advances through the route N1→N2→N3→N4→N8→N12 (refer to FIG. 12) to the node N12 and that the mobile robot 2-3 is halted at the node N4, for example, in waiting condition. The mobile robot, therefore, cannot make a reservation of the node N4 during travel, and stops once at the node N3 as mentioned above and proceeds with the following process.

(1) The mobile robot 2-1 performs the process explained in the above-mentioned fourth example of the action, and consequently detects that the mobile robot 2-3 is in the waiting condition at the node N4.

(2) The mobile robot 2-1 makes the condition data thereof to be "waiting for the completion of purge", and sends it to the control station 1 with "3" which is the robot number of the mobile robot 2-3.

(3) CPU 1a of the control station 1, responsive to this condition data and the robot number, detects that the mobile robot 2-3 is in the waiting condition, and that the purge is required, and proceeds with the following process.

(i) Detects the node numbers N3, N5, N8, and N9 connected to the node 4 where the mobile robot 2-3 is presently positioned according to the map data in the map memory 1d.

(ii) Excludes the node N3 which is in the direction of the mobile robot 2-1 and checks if other nodes N5, N8 and 9 are reserved or not by the reserve table RVT in the data memory 1f.

(iii-1) If the node N5 was not reserved, for example, transmits the command to the mobile robot 2-3 to move to the node N5.

(iii-2) If all of the nodes N5, N8, and N9 are reserved, checks the condition data of the mobile robot 2 which reserves each node and detects the one in the waiting condition. Now suppose that the mobile robot (for example 2-6) is in the waiting condition. In this case, CPU 1a transmits the command to the mobile robot 2-3 to move to the node N8.

(4) The mobile robot 2-3 which received the command to move from the control station 1, in the same manner as mentioned above, makes a reservation and starts traveling.

*In the case of (iii-1) mentioned above

The mobile robot 2-3, upon completion of reservation of the node N5, moves no the node N5. When the mobile robot 2-3 moves to the node N5, the reservation of the node N4 is canceled and the reservation for the mobile robot 2-1 is made, then the mobile robot 2-1 travels toward the node N4.

*In the case of (iii-2) mentioned above

The reservation cannot be made. Therefore, the mobile robot 2-3, as in the case mentioned above, detects the mobile robot number "6" which is blocking the travel path and sends the condition data indicative of "waiting for the completion of purge" and the robot number "6". The control station 1 purges the mobile robot 2-6 in exactly the same manner as described above.

As explained so far, in this embodiment, when the presence of the mobile robot 2-K under the waiting condition disturbs the travel of another mobile robot, the mobile robot 2-K is purged to the next node which is not reserved. In the case where all the nodes whereto the node where the mobile robot 2-K is positioned is connected via the travel path are reserved, it is purged to the node where the mobile robot 2-L in the waiting condition is positioned. In this case, the mobile robot 2-K purges the mobile robot 2-L and proceeds to the node where the mobile robot 2-L was positioned. That is to say, the mobile robot in the waiting condition is purged by being pushed out.

Operational Example 7

(Example of Travel 1)

Figure 16:
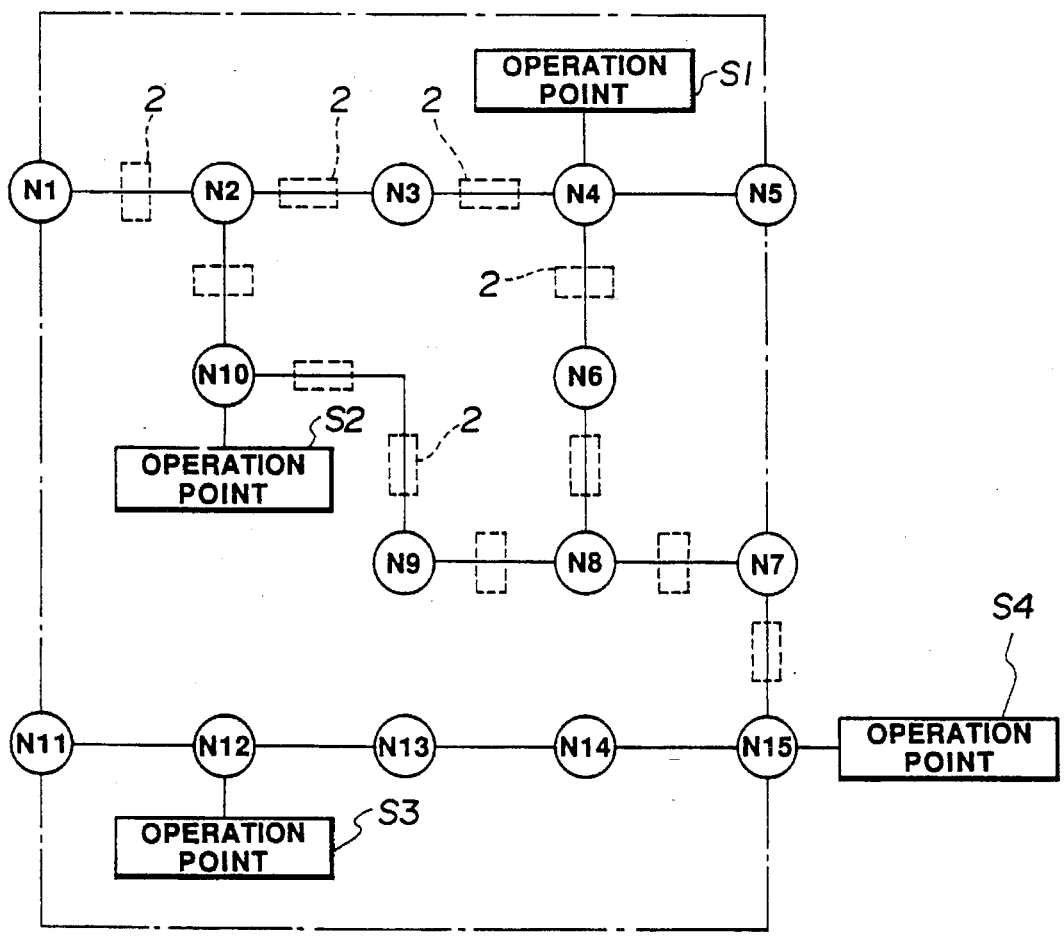

An example of the case where the control station 1 transmitted a command by radio to the mobile robot 2-1 waiting at the map approach node N1 to carry out the prescribed operation at the operation point S1 in the travel path in FIG. 16 is explained below. CPU 2a of the mobile robot 2-1 searches the travel route from the present position (the map Approach node N1) to the prescribed position (operation point S1) upon reception of said command from the control station 1. The route search is carried out by a known vertical-search method after checking the prescribed data in the map memory 2g and the traveling state table 2g which is the object and the factor of search. In this case, when the field of traveling direction command 13e in the traveling state table 2g indicates the command of "one way" between two adjacent nodes which are the objects of search, the search is carried out from the direction approved, but not from the direction prohibited. If the route N1→N2→N3→N4 was searched by this route search, CPU 2a transmits said searched route one after another to the control station 1 (upload). CPU 1a, upon reception of said searched route, checks if there is any obstacle (other mobile robot 2) on the route according to the collision table 1c, data memory If and so on, and transmits the result to the mobile robot 2-1 (download). In this case, if CPU 1a sends a transmission meaning that there is an obstacle on said route to the mobile robot 1-1, it sends a transmission meaning that there is no obstacle on said route later again to the mobile robot 2-1 when the obstacle is removed from said route (in other words, when another mobile robot 2 has passed through or moved away). The mobile robot 2-1, upon reception of a transmission meaning that there is an obstacle on said route from CPU 1a, comes into the waiting condition on the prescribed node on side route until it receives the transmission meaning that there are no more obstacles on said route later. The mobile robot 2-1, upon reception of a transmission meaning that there is no obstacle on the route from CPU 1a, CPU 2a of the mobile robot 2-1 proceeds to read the contents written in the field of traveling figure command 14e in the traveling state data block Bn corresponding respectively to the node couples (N1, N2), (N2, N3) and (N3, N4) in the travailing state table 2g. As a result, in this example, "1" (command of transverse movement) is read out for the node couple (N1, N2) and "0" (command of forward and backward movement) is read out for the node couples (N2, N3) and (N3, N4). Then, CPU 2a of the mobile robot 2-1 transfers the read contents, that is to say, a traveling figure command data to the travel control device 2h. The travel control device 2h makes the mobile robot 2 take a traveling figure shown in the supplied traveling figure indicating data and travel on the route N1→N2→N3→N4. That is to say, the travel control device 2h makes the mobile robot 2-1 move transversely between N1-N2, Then when it arrives at the node N2, it makes the node N2 spin and changes the direction of the mobile robot 2-1 through 90 degrees, and makes it travel in the figure of forward and backward movement on the route N2→N3→N4. When the mobile robot 2-1 arrives at the node N4, it proceeds to the operation point S1 by transvers movement.

(Example of Travel 2)

An example of the case where the control station 1 transmitted a command by radio to the mobile robot 2-1 waiting at the operation point S4 to carry out the prescribed work at the operation point S1 is explained below. CPU 2a of the mobile robot 2-1, upon reception of said command from the control station 1, proceeds with the search of the travel route from the present position (working point S4) to the prescribed place (working point S1) by the same method as in the example of travel 1. In this case, If the traveling direction between nodes is not a factor of search, the route N15→N7→N8→N6→N4 will be searched. However, in this example, since the traveling direction between nodes is a factor of search, the route search is carried out by referring to the traveling direction between nodes as explained above. Now, in this example, the robot can move on the route N4→N6→N8 as mentioned above, however, the movement in the reverse direction is prohibited. Therefore, the route N15→N7→NS→N6→N4 is nee searched, and the alternate route N15→N7→N8→N9→N10→N2→N3→N4 shown in FIG. 2 is searched as a result. The action processing procedure in the case where the mobile robot 2 moves on the alternative route to the working point S1 by keeping data transmission with the control station 1 after the search of the alternative route is omitted as it is the same as the example of travel 1.

In this way, according to said structure, the collision between the mobile robot and the installed equipment can be avoided, and the space can be effectively and safely ensured between installed equipment and mobile robots.

The above-mentioned first embodiment is about mobile robots which travel on magnetic tape attached to the floor by detecting the same magnetic tape, however, this invention can be applied also for the mobile robot which travels by detecting conditions therearound by ultrasonic sensor.

[Embodiment 2]

Now, embodiment 2 is explained below.

Figure 17:
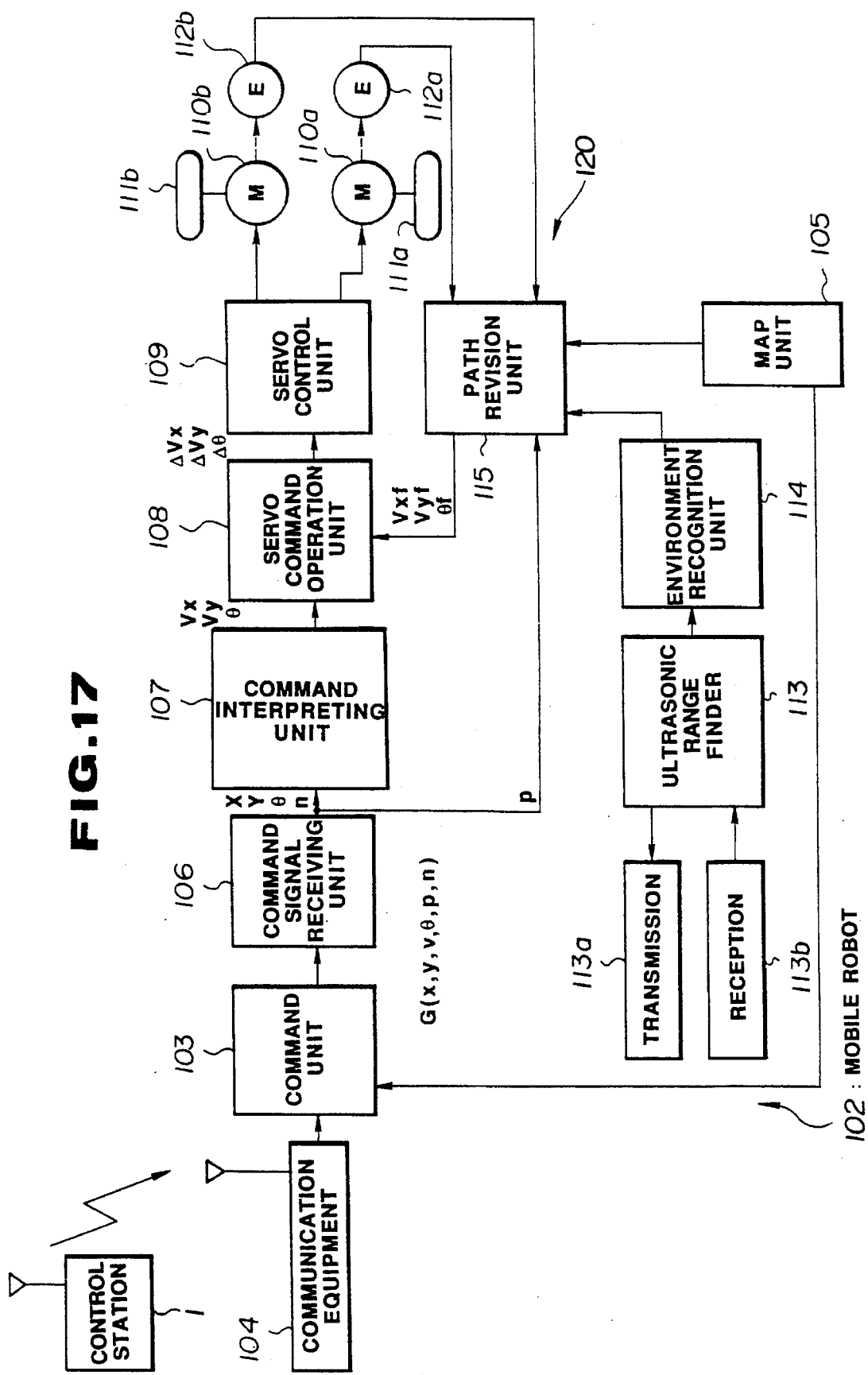
FIG. 17 is a block diagram showing the structure of the mobile robot 102 in the embodiment 2.

FIG. 17 is a block diagram showing the structure of the mobile robot 102. The rough structure of the mobile robot system of this example is the same as the above FIG. 1. Referring now to FIG. 17, 103 denotes the command section which, when the target node prescribed by the control station 1 for controlling a plurality of mobile robots 102 is supplied via the communication device 104 by radio, searches the most suitable route according to the map stored in the map section (described later), determines nodes to pass over when proceeding to the destination and prepares and outputs the travel command G (x, y, . . . ) (described later) required for traveling along the predetermined travel route which is made by connecting these nodes one after another.

106 denotes the command receiving section for receiving the travel command G (x, y, . . . ) supplied from the command section 103 one after another, and consists of FIFO (first-in, first-out) buffer. The command receiving section 106 supplies the received travel command G (x, y, . . . ) to the command interpret section 107 and the track correction a series of travel commands G (x, y, . . . ), prepares the travel pattern of the mobile robot 102 and supplies it as a travel pattern signal Vx, Vy, θ to the servo command preparation section 108. Here, the travel pattern consists of the speed pattern, rotation pattern, and halt pattern, and so on. The servo command preparation section 108 reads the travel pattern signal Vx, Vy, θ supplied from the command interpret section 107 at every prescribed sampling cycle, computes the deviation signals Vx, Vy, by comparing them with the feedback signals Vxf, vyf, θf analog signals and feeds them to the servo control section 109. By this procedure, the servo control section 109 drives and controls the motors on the right and left 110*a* and 110*b* so that the above-mentioned deviation signals ΔVx, ΔVy, Δθ become zero and turns wheels on the right and left 111*a* and 111*b*. The speed of the motors 110*a* and 110*b* are converted into the electric pulses by the encoders on the right and left 112*a* and 112*b* connected respectively with the axes of rotation of the motors 110*a* and 110*b* and fed to the track correction section 115. 113 denotes the ultrasonic range finding section 113 for measuring the distance from the mobile robot to the walls on the right and left side. Said ultrasonic range finding section 114 drives the ultrasonic transmitters 113*a* installed on the right and left sides to discharge the ultrasonic waves toward right and left walls, receives the reflected waves from the right and left walls by the ultrasonic receivers 113*b* on the right and left sides respectively and measures the distance to each wall on the right and left by the elapsed time. The measured result is fed to the environment recognizing section 114. The environment recognizing section 114 transfers said measured result to the track correction section 115, detects the presence or absence of the wall or the changing point (edge) and in addition feeds the result of this detection to the track correction section 115. The track correction section 115 counts the pulse signals sent from the right and left encoders 112*a* and 112*b* respectively and obtains the travel distance and travel speed, and the angle of rotation from the difference of the pulse signals between right and left. The track correction section 115 compares the travel distance, travel speed and the angle of rotation computed from the above-mentioned pulse signals with the output data from the environment recognizing section 114 and prepares the feedback signal Vxf, Vyf of the speed and the feedback signal θf of the single of rotation in order to travel according to the contents of the scean table SCT (described later) of the map section 105. The structure of this embodiment is as explained so far, the travel section 120 is composed of the above-mentioned components 106 to 115 and the mobile robot 102 is composed of the command section 103 and the travel section 120.

\* Map (information)

Next, the map (information) stored in the map section 105 is explained in detail below.

The map is composed of the node number table NTD, the network information table NWT and scene table SCT.

(I) Node number. table NDT (FIG. 18)

In the node number table NDT, as shown in FIG. 18, the registered node number is stored in the order of registration.

(II) Network information table NWT (FIGS. 19(*a*) and 19(*b*))

In the network information table NWT, the network information of the registered node is stored in correspondence with the node number as shown in FIGS. 19(*a*) and 19(*b*). The network information table NWT is composed of the following area.

(A) Area world coordinates of nodes

In this area, the position data of corresponding nodes indicated by the XY coordinate system is described.

(B) Area world coordinates of operation point

In this area, the position data of the operation indicated by XY coordinates system is resistered. Howere, this data is not registered unless the operation point is connected to the corresponding node.

(C) Area of connecting node number

In this area, numbers of other nodes connected to corresponding nodes are stored. In this example, the number of nodes connected to one node is 4 at maximum. Therefore 4 node numbers can be stored at maximum.

(D) Area of scene table number

This area indicates in which scene table SCT a series of scenes between nodes corresponding to the connecting node number are stored.

(E) Area scene offset

In this area is stored the scene pointer (adress) indicating from which byte of the scene table SCT a series of scenes starts between nodes corresponding to the connecting node numbers.

The above-mentioned node number table NDT and the network information table NWT is referred to when the command section 3 carries out the route search and prepares the travel command.

(III) Scene table SCT

This scene table SCT is, as shown in FIGS. 20(*a*) and (*b*), a table storing a series of scenes (positions of walls) from one node to the next node and %he travel conditions in correspondence with the scene pointer (the contents of the field of scene offset).

The scene table SCT is composed of the following fields.

(A) Area start-point node number

In this area, the start-point node number is stored.
(B) Area end-point node number is stored. The start-point node and the end-point node are so designated that one of the two adjacent codes is arbitrarily designated the start-point node and the other is designated the end-point node.

(C) Area rectilinear distance between nodes

In this area is stared the value of rectilinear distance from the start-point node to the end-point node obtained from the position coordinates is stored.
(D) The area of the measured value of the distance from the start-point node to the end-point node is stored, provided that the value exists only in the case where the line between nodes is not a straight line. When the line between nodes line, 0 is stored.

(E) Area forward travel offset

In this area is stored the travel offset value from the datum line in the case of traveling from the start-point node to the end-point node. The datum line here means a straight line connecting the smart-point node and end-point node (described later). When said travel offset value is positive (for the advancing direction), it directs the offset travel to the left side of the datum line, and when the travel offset value is negative, it directs the offset travel to the right side of the datum line. For example, when the travel offset value is +d (positive), it means the command to travel at the distance d away from the datum line on the left (refer to FIG. 121). While, when the value is −d (negative), it means the command to travel at the distance d away form the datum line on the light. In this way, the right side pass, the left side pass, the right end pass or the left end pass con be specified by specifiying the travel offset value voluntarily.

(F) Area reverse travel offset

In this area, the travel offset value from the datum line in the case of traveling end-point node to the start-point node is stored. The datum line and the travel offset value is as explained in the area of forward travel offset.

(G) Area maximum speed

In this area, the maximum speed between nodes is stored.

(H) Area left side scene command

In this area, the condition of the left wall is described. In the case where there is a wall within the maximum measuring distance of the ultrasonic range finding section 113, the "distance to the wall" and the length of that wall is described. The datum line described above is specified by the "distance to the wall". In other words, it means than when the distance between the left wall and the left surface of the robot is kept in the "distance to the wall", the mobile robot 102 is positioned on the datum line. When there is any changing point (edge) on the wall, the "distance to the wall" and the length to said wall are described at every changing point. When there is no wall within the maximum measuring distance of the ultrasonic range finding section 113, in other words, on the open state, the distance of the open section is described.

(I) Area right side scene command

In this area, the condition until the wall on the right is described. The contents of the description is identical to the explanation for the field of left side scene command.

The Above-mentioned scene table SCT is referred to by the travel section 120 when the mobile robot 102 travels.

* Travel command

The travel command prepared by the command section 103 is explained in detail below.

The travel command consists of a GO command and a WAIT command.

(1) GO command

Go command is the command to supply information for traveling on the continuous route.

Go command is expressed in the following form.

<GO>=GO (x, y, v, θ, p, n)

Here, X is a parameter which specifies the traveling distance (mm) in the direction of the X-axis shown in FIG. 21. When x is positive, the distance of forward movement of the mobile robot 102 is specified, and when x is negative, the distance of backward movement thereof is specified. y is a parameter which specifies the travelling distance (mm) in the direction of Y-axis shown in FIG. 21. When y is positive, the distance of the leftward movement of the mobile robot 102 is specified, and when y is negative, the distance of the rightward movement thereof is specified. v is a parameter indicative of the combined speed of the speed component of X-axis (forward and backward movement) and the speed components of Y-axis (right and left movement). θ is a parameter indicative of the angle of rotation (rad) of the mobile robot 2 at the time of execution of command (the counter-clockwise rotation of θ is specified as normal direction). p is the above-mentioned scene pointer. n specifies the node number whereto the mobile robot arrives after execution of the command.

(2) WAIT command

This command directs stopping of the traveling action, stopping method, the condition of the brake after stopping and the condition of servo power supply after stopping and supplies information such as the reason if stopping. The WAIT command is expressed in the following form.

<WAIT>=WAIT (f, b, s, r)

Here, f is a parameter specifying the stopping method. When f is "0", it means stopping after slowing down and when f is "1", it means a sudden stop. b is a parameter specifying the condition of the brake after stopping. When b is "0", it means the condition where the brakes are not applied; and when b is "1", it means the condition where tha brakes are applied. s is a parameter specifying the condition of the servo power source after stopping. When s is "0", it means that the servo power source is in the ON condition; and when s is "1", it means that the servo power source is in the On condition, respectively. r is a parameter indicative of the reason of slopping. When r is "0", it means normal slopping; when r is "1", it means a stopping condition after determining the working position; and when r is "3", it means a stopping condition after the termination of the job.

(Example of offset travel)

Referring now to FIG. 21, the case where the mobile robot 102 makes a offset travel such as a left side pass is explained below.

Suppose that the track correcting section 115, responding to the supply of the scene pointer p which is a component of the GO command from the command receiving section 106, read the scene specified by supplied scene pointer p from the scene table SCT of the map section 105, observed the "distance to the wall" in the fields of the left side scene command and the right side scene command, and recognized that both of the "distance to the wall" were D. Next, suppose that it checked the field of travel offset (supposing that it is now the case of forward travel, it checks the field of the forward offset), and recognizes that the value of the travel offset was +d. By these steps, the track correcting section 115 recognizes that it must travel on the left at a distance d away from the datum line. That is to say, it recognizes that it must travel on the line at the distance of (D+d) away from the right wall (at the distance of (D−d) away from the left wall) (refer to FIG. 21). Then it prepares the feedback signal of the angle of rotation θf and sends it to the servo command preparation section 108 so that the mobile robot 102 travels on the line at the distance of (D+d) away from the right wall.

Figure 22:
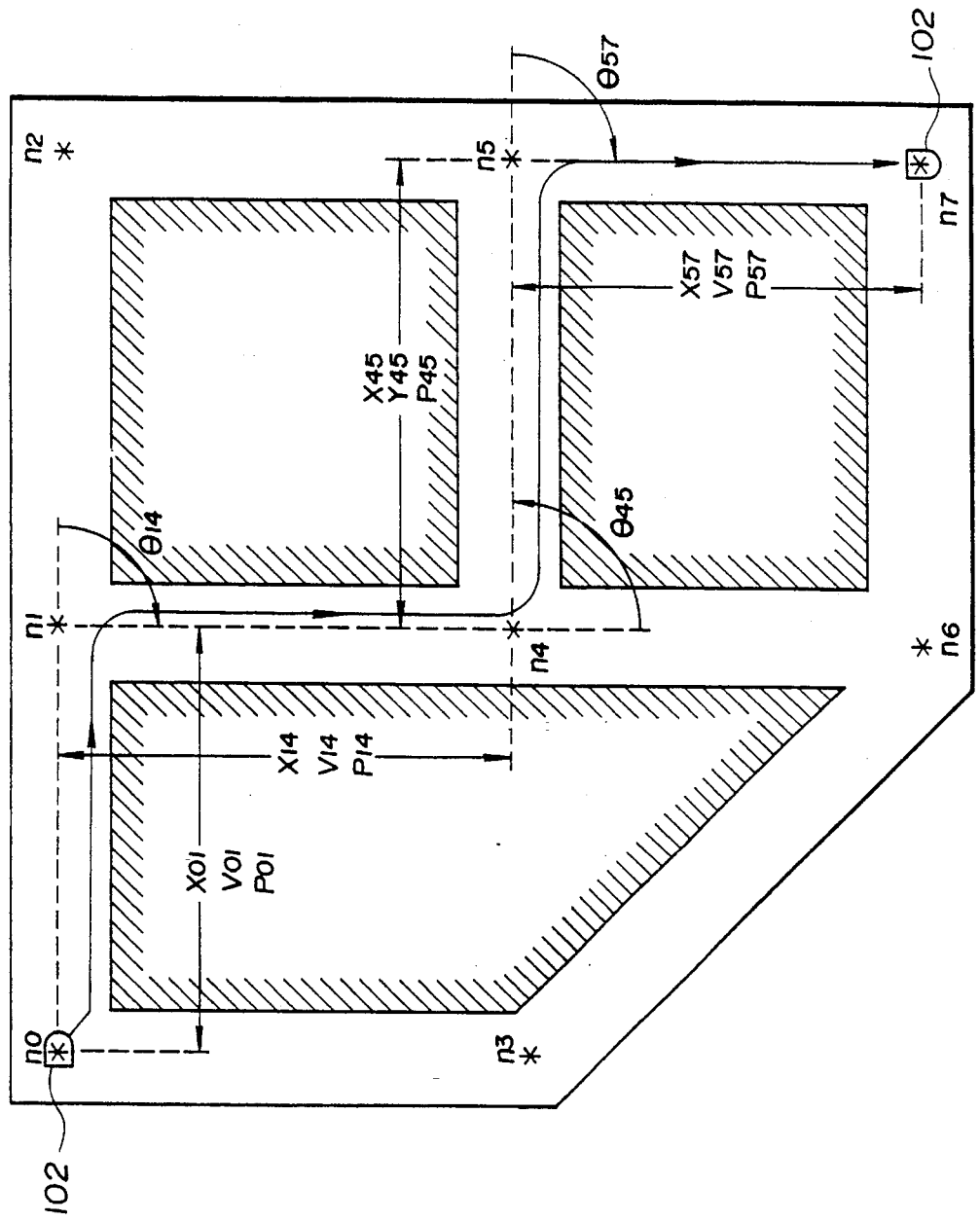
FIG. 22 is a travel path for explaining the action of the same mobile robot 102.
Figure 23:
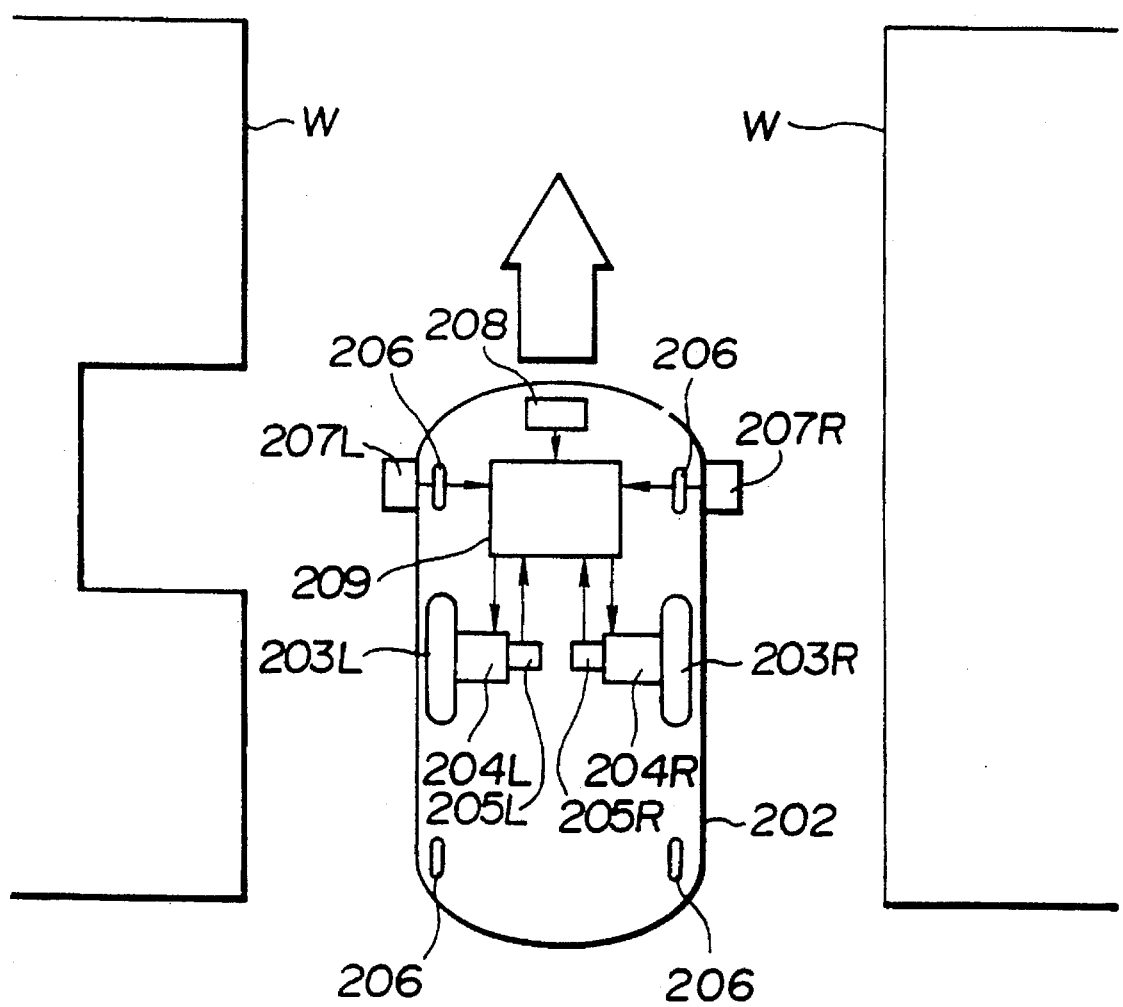
FIG. 23 is a plan view showing the conceptual structure of the mobile robot 202 in the embodiment 3.

Now, the action of the above-mentioned mobile robot 102 is explained below, referring to FIG. 22.

Suppose that the mobile robot 102 is waiting at the node n0 facing in the direction of the node $n_1$. When the control station 1 directed the node $n_7$ as a destination, the command section 103 which received this direction searches the shortest route from the node n0 to $n_7$ according to the map (information) of the map section 105, and determines the route $n_0$-$n_1$-$n_4$-$n_5$-$n_7$. The search method applied here is a known vertical search method or transverse search method. When the route is determined in this way, the command section 103 prepares a series of travel commands as the command to transfer to the travel section 120 as follows.

<GO$_1$>=GO ($x_{01}$, 0, $v_{01}$, 0 $p_{01}$, 0 $n_1$)

<GO$_2$>=GO ($x_{14}$, 0, $v_{14}$, −1.5708, $p_{14}$, $n_4$)

<GO$_3$>=GO ($x_{45}$, 0, $v_{45}$, +1.5708, $p_{45}$, $n_5$)

<GO$_4$>=GO ($x_{57}$, 0, $v_{57}$, −1.5708, $p_{57}$, $n_7$)

<WAIT>=WAIT (0, 1, 0, 0)

The first travel command <GO$_1$> means that when the mobile robot advances $x_{01}$ from the present node $n_0$ at the speed of $v_{01}$ without changing the direction, it reaches the node $n_1$, and at the same time, that the secne (scene of the wall therearound) which way be encountered during the address $p_{01}$ of the scene table SCT. The second travel command <GO$_2$> means that when the mobile robot advances $x_{14}$ from the node $n_1$ at the speed of $v_{14}$ in the direction of $\theta_{14}$=−1.5708 rad, in other word, 90 degrees in the clockwise direction it reaches the node $n_4$ and that the scene of the wall therearound which may be seen during travel from the node $n_1$ to the node $n_4$ is stored in the address $p_{14}$. The third travel command <GO$_3$> means that when the mobile robot advances $x_{45}$ from the node $n_4$ at the speed of $v_{45}$ in the direction of $\theta_{45}$=+1.5708 rad, in other ward, 90 degrees in the counter-clockwise direction, it reaches the node $n_5$ and that the scene (the scene of the wall therearound) which may be encountered during travel from the node $n_4$ to the node $n_5$ is stored in the adress $p_{45}$ of the scene table. The fourth travel command <GO$_4$> means that when the mobile robot advances $s_{57}$ from the node $n_5$ at the speed of $v_{57}$ n the direction of $\theta_{57}$=−1.5708 rad direction, in other words, 90 degrees in the clockwise direction, it reaches the node $n_7$ and that the scene which may be encountered from the node 5 to the node 7 is stored in the address $p_{57}$. The fifth travel command <WAIT> directs to stop the action of stopping after slowing down and to apply the brakes after stopping and set the servo power source to the OFF- condition.

When the command receiving section 106 receives the travel command, as mentioned above, the command receiving section 106 transfers the received travel command to the command interpret section 7 and the scene pointer p which is a component of the GO command to the track correcting section 115. The command interpret section 107 interprets supplied travel commands, prepared the travel pattern (speed pattern, rotation pattern) and sends it to the servo command preparation section 108. On the other hand, the track correcting section 115, responsive to the supply of the scene pointer, reads the scene specified by said scene pointer p in the scene table SCT of the map section 105 and prepares the feedback signal of the speed and the angle of rotation by comparing the output data from the environment recognizing section 114 with the output pulses from the encoders 112a and 112b so as to follow the command and contents of said scene. Therefore, when the value of the travel offset specified by the scene pointer $p_{01}$ is −$d_{01}$, the mobile robot 102 travels from the node $n_0$ to the node $n_1$ on the right side as shown in FIG. 122; when the value of the travel offset specified by the scene pointer $p_{14}$ is +$d_{14}$, the mobile robot 102 travels from the node $n_1$ to the node $n_4$ on the left side; when the value of the travel offset specified by the scene pointer $p_{45}$ is −$d_{57}$, the mobile robot 102 travels from the node $n_4$ to the node $n_5$ on the right side; when the value of the travel offset specified by the scene pointer $p_{57}$ is 0, the mobile robot 102 travels on the center of the node $n_7$.

According to said structure, since the mobile robot offset travels relative to the standard travel path, collision can be avoided even when a mobile robot 102 traveling in the normal direction and another mobile robot 102 traveling in the reverse direction, exist on the arbitrary travel path simultaneously.

In the embodiment above, the offset value written in the area of the travel offset is regular between said nodes (for example between the node $n_0$ and the note $n_1$). However, it is also possible, for example, to divide the section between the node $n_0$ and the node $n_1$ into specified sections and set different offset value for each section respectively. By doing so, in the case where there are a plurality of obstacles positioned irregularly, the mobile robot can follow a zigzag travel path to avoid said obstacles.

[Embodiment 3]

Now, the embodiment 3 is explained below.

Figure 24:
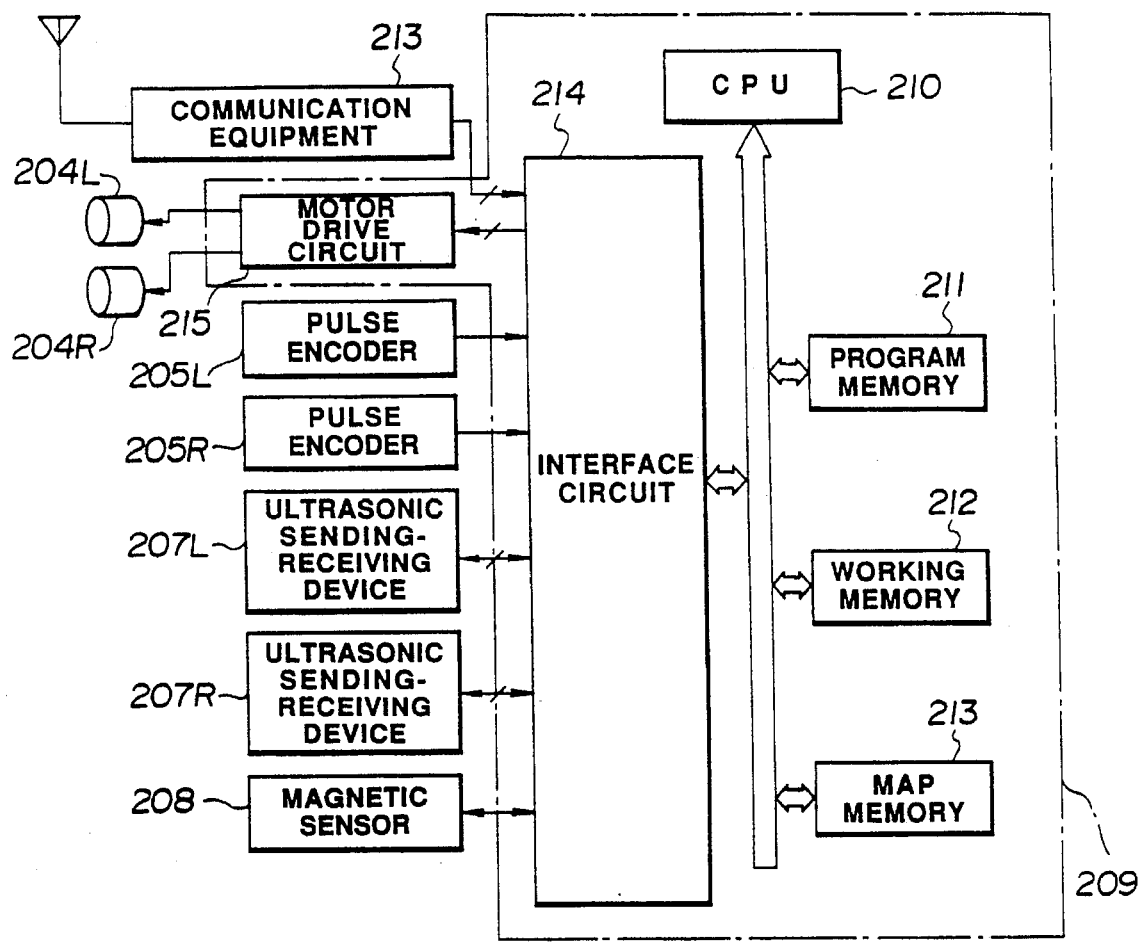
FIG. 24 is a block diagram showing the electrical structure of the mobile robot 202 in the same embodiment.

FIG. 123 is a plan view showing schematically the structure of the mobile robot 202 of this embodiment. The upper part of the drawing is the front of the mobile robot 202. In FIG. 123, 203L denotes the left driving wheel; 203R denotes the right driving wheel; 204L denotes the motor for rotating the left driving wheel 203L; 204R denotes the motor for rotating the left driving wheel 203L; 204R denotes the motor for rotating the right driving wheel 203R; 205L denotes the pulse encoder to detect the speed of the left driving wheel 203L; 205R denotes the pulse encoder to detect the speed of the right driving wheel 203R; and 206, 206, etc. denote wheels. These wheels 206, 206, etc are rotatable relative to the shaft center respectively and also rotatable relative to the direction which makes a right angle to the respective shaft centers. 207L and 207R denote the ultrasonic wave transmitters (ultrasonic sensors) for detecting the distance to the side walls W on the right side and the left side, 208 denotes the magnetic sensor for detecting the magnetic tape attached to the floor and 209 denotes the control device. The control device 209 includes, as shown in FIG. 24, CPU (central processing unit) 210, the program memory 211, the work memory 212, the map memory 213, the interface circuit 214 and the motor drive circuit 215. The program to control CPU 210 is stored in the program memory 211. The network information table and scene table are respectively stored in the map memory 213. Said network information table is the same one as explained in the embodiment 2. The scene table here is the same as the one explained in the embodiment 2, but scene data is added thereto.

Now, the scene data is explained below. The mobile robot 202 is so constructed that it can travel both by ultrasonic wave system and by the magnetic tape system. For example, the system used for the travel on each section between nodes on the travel path in FIG. 2 is predetermined, and when the magnetic tape system in taken for the travel path between certain nodes, the code indicative of the magnetic tape (hereinafter referred to as tape code) is written as scene data in the scene table corresponding to the section between said nodes; while when the ultrasonic wave system is taken for the travel path, the distance data indicative of the distances from the travel path to the walls on the right side and the left side is written as a scene data.

213 in FIG. 24 denotes the communication device for receiving the direction (indicating the destination node) sent from the control station 1 by radio. The direction received by this communication device 213 supplied to the control device 209.

In the mobile robot 202 constructed as above, CPU 210 carries out the travel control according to the program written in the program memory 211 as follows.

CPU 210, upon reception of the destination node number from the control station 1, searches the optimum route by the known vertical search method according to the map information written in the map memory 213 and determines nodes over which the robot passes on the way to the destination. The, CPU 210 reads the scene data in the scene table corresponding to the node couple consisting the node to which the robot should go next. If the scene data is the tape code, the robot travels to the next node by tape travel. That is to say, CPU 210 reads the output of the magnetic sensor 208 via the interface circuit 124 at regular intervals, detects the distance between the magnetic sensor 208 and the magnetic tape on the floor according to the read data, and output the control data to the motor drive circuit so that the distance is minimized. The motor drive circuit 215 drives the motors 204L and 204R according to supplied control data.

On the other hand, when the scene data read form the scene table was not the tape code, the robot travels to the next node by ultrasonic wave travel. That is to say, CPU 210 reads the output of the ultrasonic wave transmitters 207L and 207R one by one and-detects the distances to the walls on the right and left according to the read data, then reads the scene data (the distances to the walls on the right and left) and detects which direction and the number of the present travel position of the mobile robot deviates from the normal travel position by comparing read scene data and the distance detected by the output of the ultrasonic wave transmitters 207L and 207R, and outputs the control data based on the result of detection to the motor 204L and 204R according to the control data being supplied.

When the mobile robot 202 reached the next node, CPU 210 reads the scene data from the scene table again and detects the travel system to the next node, and the mobile robot travels to the next node by detected travel system.

Figure 25:
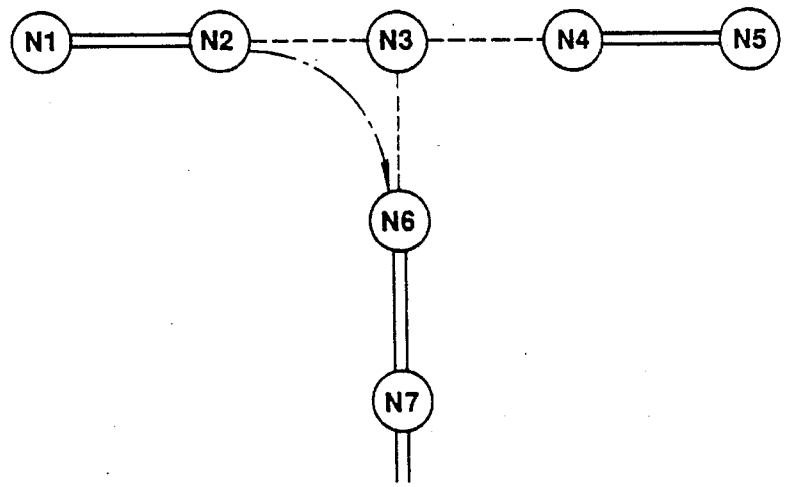
FIG. 25 is a drawing showing the example of the travel path to be used for the explanation of the embodiment 3.

As explained above, the mobile robot 202 in this embodiment can travel by both system: by the tape system and by the ultrasonic wave system. Therefore, for example, in the case of travelling from the node N1 to the node N7 in the travel path shown in FIG. 25, if only tape travel is available, the route N1→N2→N3→N6→N7 will be taken, however, by employing ultrasonic wave travel, the mobile robot 202 can take the route N1→N2→N6→N7 wherein ultrasonic wave travel is taken for the rout N2→N6, which makes the travel smoother than the case where tape travel is employed.

As mentioned so far, according to this embodiment, the mobile robot 202 can take tape travel which is more stable for the section where the tape travel is possible, and take ultrasonic wave system for the section where the tape cannot be attached.

In the embodiment mentioned above, the case wherein the mobile robot travels along the magnetic tape by detecting said tape is described, however, it is also possible to replace the magnetic tape with optical tape.

The mobile robot of this invention can also be applied to the mobile robot simply for automatic travel (for transportation, etc.) for robots without arms as well as robots with arms.

What is claimed is:

1. A travel control method for a mobile robot system comprising a plurality of mobile robots, a control station for controlling said mobile robots and radio communication apparatus for communicating between each of said mobile robots and said control station, each of said mobile robots having a map memory for storing travel map information, means for determining a best travel route to a destination based on said travel map information, and at least one sensor mounted on each of said robots for detecting said best travel route, said travel control method comprising the steps of:

designating by means of said control station a destination for each of said mobile robots;

communicating said determinations to said mobile robots via said radio communication apparatus;

determining within each of said mobile robots said best travel route based on said travel map information read out from said map memory when said designation has been designated by said control station;

transmitting from each of said mobile robots to said control station a request to reserve each position on said best travel route determined by said mobile robot;

reserving in said control station said best travel route for each of said mobile robots based on said reservation request from each of said mobile robots;

moving each of said mobile robots automatically along said reserved best travel route, each of said mobile by the at least one sensor;

storing data indicative of the travel configuration of said mobile robot and data indicative of unidirectional travel, said travel configuration including transverse movement and forward and backward movement; and controlling the travel of the mobile robot according to the contents of said travel state memory.

2. A travel control method for a mobile robot system comprising a plurality of mobile robots, a control station for controlling said mobile robots and radio communication apparatus for communicating between each of said mobile robots and said control station, each of said mobile robots having a map memory for storing travel map information, means for determining a best travel route to a destination based on said travel map information, and at least one sensor mounted on each of said robots for detecting said best travel route, said travel control method comprising the steps of:

designating by means of said control station a destination for each of said mobile robots;

communicating said determinations to said mobile robots via said radio communication apparatus;

determining within each of said mobile robots said best travel route based on said travel map information read out from said map memory when said designation has been designated by said control station;

transmitting from each of said mobile robots to said control station a request to reserve each position on said best travel route determined by said mobile robot;

reserving in said control station said best travel route for each of said mobile robots based on said reservation request from each of said mobile robots; and moving each of said mobile robots automatically along said reserved best travel route, each of said mobile by the at least one sensor;

wherein said map information includes travel offset data indicative of a travel offset value from a travel datum for every travel element path and for every travel direction, wherein travel of said robot is controlled according to said offset data, said travel offset data being indicative of a right side pass, a left side pass, a right end pass and a left end pass, and wherein said mobile robot sensor also detects and measures distances to objects along the best travel route.

3. A travel control system for controlling the motion of a plurality of mobile robots, said system comprising:

a control station including:

a) means for indicating a destination of each mobile robot;

b) means for reserving a travel route for each mobile robot;

c) means for transmitting to each mobile robot the travel routes of the other mobile robots, position data indicative of the present position of other mobile robots and condition data indicative of the present condition of other mobile robots;

d) a collision table storing the positions of nodes a which a collision a collision between mobile robots may occur; and e) approach prohibition means for receiving travel route information from said mobile robots, reaching nodes stored in said collision table corresponding to the same travel route, and prohibiting the approach of other said mobile robots to said node;

and in which each mobile robot comprises:

a) means for searching for the route indicated by the control station and sending information indicative of the route to the control station;

b) automatic travel means for traveling automatically along the found travel route;

c) travel data information means for informing the control station of position data indicating the present position of the mobile robot along the travel route and condition data indicating the present condition of the mobile robot;

d) travel data memory means for writing the travel route of other mobile robots, position data indicating the position of other mobile robots and condition data indicating the present condition of other mobile robots;

e) a travel state memory for storing data indicative of the travel configuration of said mobile robot and data indicative of unidirectional travel, said travel configuration including transverse movement and forward and backward movement; and f) means for controlling the travel of the mobile robot according to the contents of said travel state memory.

4. A travel control system for controlling the motion of a plurality of mobile robots, said system comprising:

a control station including:

a) means for indicating a destination of each mobile robot;

b) means for reserving a travel route for each mobile robot;

c) means for transmitting to each mobile robot the travel routes of the other mobile robots, position data indicative of the present position of other mobile robots and condition data indicative of the present condition of other mobile robots;

d) a collision table storing the positions of nodes a which a collision a collision between mobile robots may occur; and e) approach prohibition means for receiving travel route information from said mobile robots, reaching nodes stored in said collision table corresponding to the same travel route, and prohibiting the approach of other said mobile robots to said node;

and in which each mobile robot comprises:

a) means for searching for the route indicated by the control station and sending information indicative of the route to the control station;

b) automatic travel means for traveling automatically along the found travel route;

c) travel data information means for informing the control station of position data indicating the present position of the mobile robot along the travel route and condition data indicating the present condition of the mobile robot; and d) travel data memory means for writing the travel route of other mobile robots, position data indicating the position of other mobile robots and condition data indicating the present condition of other mobile robots;

wherein said map information includes travel offset data indicative of a travel offset value from a travel datum for every travel element path and for every travel direction, and wherein said robot further comprises a travel control section for controlling travel according to said offset data, said travel offset data being indicative of a right side pass, a left side pass, a right end pass and a left end pass, said mobile robot further having a sensor for detecting and measuring distances to objects along the travel route.

* * * * *